US012192558B2

(12) United States Patent
Gratton et al.

(10) Patent No.: US 12,192,558 B2
(45) Date of Patent: *Jan. 7, 2025

(54) SYSTEMS AND METHODS FOR VERSATILE VIDEO RECORDING

(71) Applicant: DISH Network L.L.C., Englewood, CO (US)

(72) Inventors: Max Stephen Gratton, Parker, CO (US); Matthew H. Polson, Castle Rock, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/509,719

(22) Filed: Oct. 25, 2021

(65) Prior Publication Data

US 2022/0141517 A1    May 5, 2022

Related U.S. Application Data

(63) Continuation of application No. 17/088,223, filed on Nov. 3, 2020, now Pat. No. 11,190,828.

(51) Int. Cl.
*H04N 21/4147* (2011.01)
*G11B 27/034* (2006.01)
(Continued)

(52) U.S. Cl.
CPC ....... *H04N 21/4147* (2013.01); *G11B 27/034* (2013.01); *G11B 27/34* (2013.01); *H04N 21/47217* (2013.01); *H04N 21/485* (2013.01)

(58) Field of Classification Search
CPC ......... H04N 21/4147; H04N 21/47217; H04N 21/485; G11B 27/034; G11B 27/34
See application file for complete search history.

(56) References Cited

U.S. PATENT DOCUMENTS

2015/0318020 A1    11/2015  Pribula
2016/0225408 A1*   8/2016   Khan ..................... G11B 27/34
(Continued)

*Primary Examiner* — Thai Q Tran
*Assistant Examiner* — Jose M Mesa
(74) *Attorney, Agent, or Firm* — Jeremiah J. Baunach; Frontier IP Law PLLC

(57) ABSTRACT

System and methods are disclosed that improve the speed, efficiency and usefulness of digital video recording systems. In some embodiments, during recording of a video capturing live action, a video recorder receives an indication of selection of a dynamic in-point selection user interface element. The video recorder determines an in-point for the video based on when the indication of the selection of the dynamic in-point selection user interface element was received. The video recorder then stops recording of the video in response to user input indicating to stop recording of the video. After stopping recording of the video, in response to user input indicating to start playing the video that was recorded, the video recorder starts playing the video from the in-point instead of a beginning of the video. In other embodiments, the user may be provided options to keep the entire originally recorded video, adjust the in-point, or to have the video be automatically edited based on the in-point in response to some other action, such as uploading the video to a social media site.

20 Claims, 17 Drawing Sheets

(51) Int. Cl.
*G11B 27/34* (2006.01)
*H04N 21/472* (2011.01)
*H04N 21/485* (2011.01)

(56) References Cited

U.S. PATENT DOCUMENTS

2017/0257674 A1 9/2017 Horita
2018/0012629 A1 1/2018 Jaime et al.
2018/0132006 A1 5/2018 Galant et al.
2018/0310224 A1* 10/2018 Hardee ................ H04W 4/023
2020/0059705 A1* 2/2020 Tsukaya ........... H04N 21/21805

\* cited by examiner

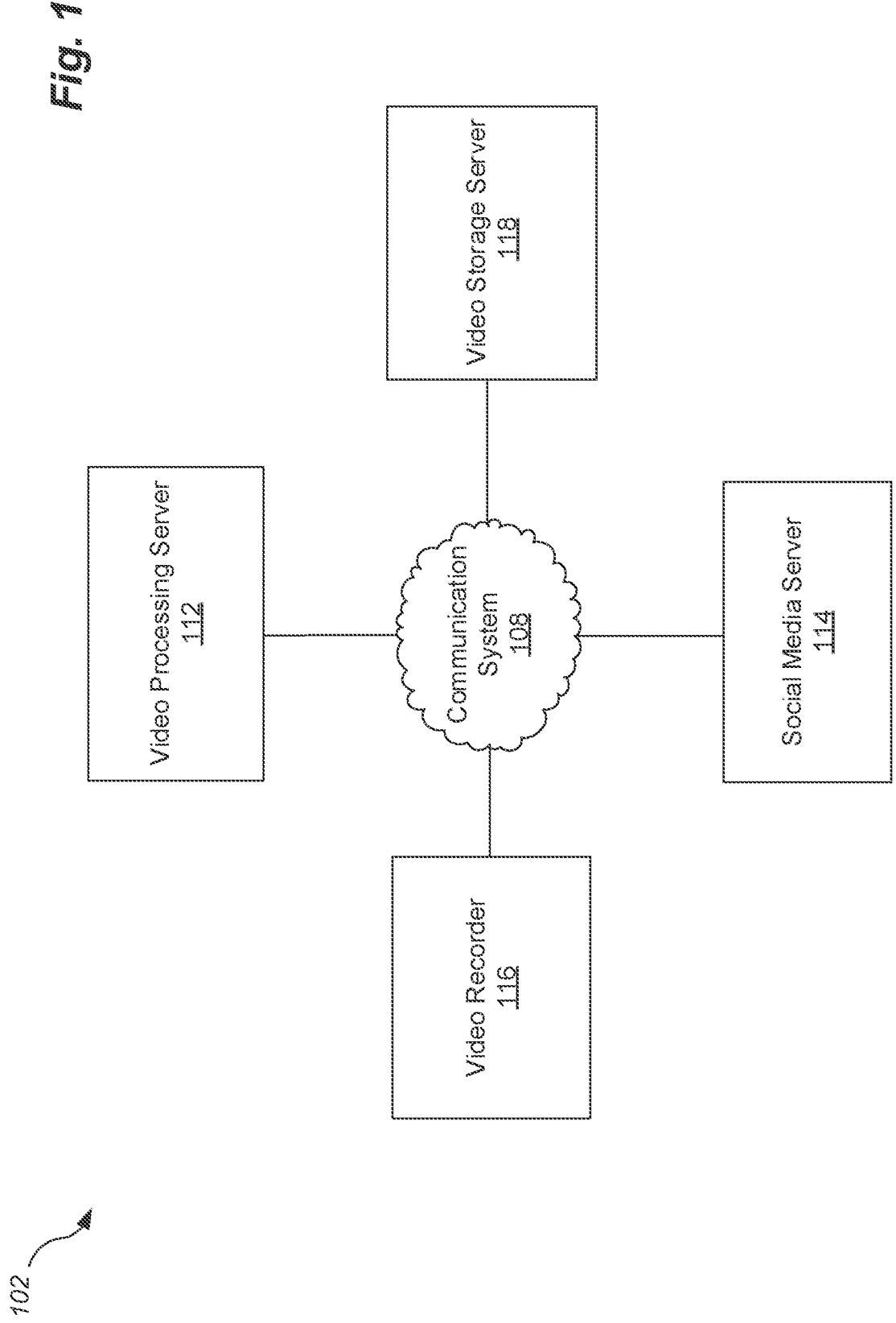

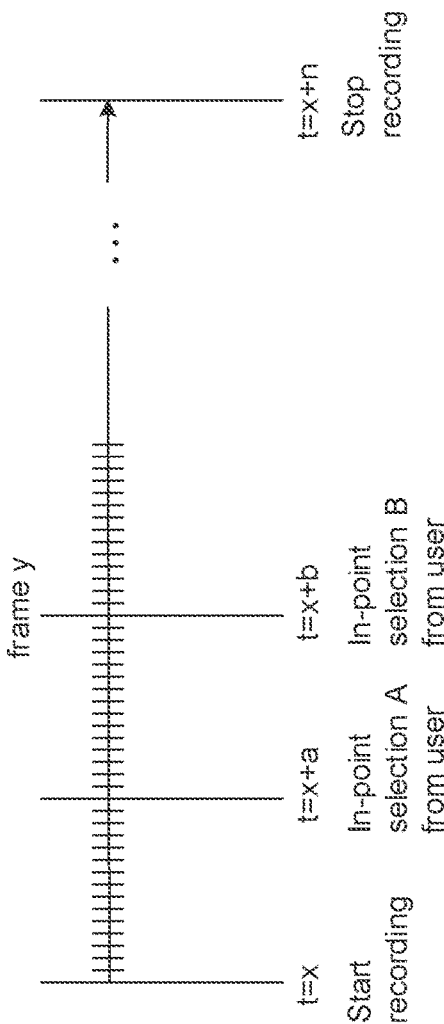
Fig. 2A
Fig. 2B

SYSTEMS AND METHODS FOR VERSATILE VIDEO RECORDING

TECHNICAL FIELD

The technical field relates to digital video recording and more particularly, to operations of digital video recording devices.

BRIEF SUMMARY

The increasing prevalence of video cameras in mobile devices such as smartphones along with an equally increasing advancement in technology to create and instantly post videos online from such devices has brought with it an explosion in the popularity of quick and easy home video production on one's smartphone for purposes of posting short videos online to social media sites. In order to capture just right moment to include in an online video post, users often must stop and re-start their recordings many times and then go back through all these recordings on their smartphones to find the right one. In other situations, a user must search through and edit a very long recording to capture the desired moment. Traditional video recording and editing systems fall short in their ability to alleviate this technical problem.

To solve the above and other technical problems, the systems and methods described herein enable a user that is using their smartphone to capture live action to effectively "re-start" the recording immediately by the press of a button or voice command after the user has already started recording. This is useful in many circumstances when the user is waiting for action or a specific moment to occur or would like to do a re-take after starting recording, but does not want to end up having to edit a long video on their phone that includes all the recorded video prior to that point. For example, instead of going back after stopping recording to find the recorded video on their smartphone and then start the video, manually search in the video for the recorded moment they wanted to capture and then edit the video on their smartphone accordingly, the user presses a button during recording that results in designating or otherwise marking an in-point at which the recorded video is to start. The user may press the button to "re-start" the recording multiple times during recording and their smartphone will use the most recent button press during recording to designate or otherwise mark the in-point at which the recorded video is to start. For example, after the user stops recording the video, the original recorded video may be automatically edited or otherwise set to start at the in-point when played.

In other embodiments, the user may be provided options to keep the entire originally recorded video, adjust the in-point (or have it adjusted automatically), or have the video be automatically edited in response to some other action, such as uploading the video to a social media site.

Therefore, the speed, efficiency and usefulness of digital video recording systems is improved by the systems and methods disclosed herein.

BRIEF DESCRIPTION OF THE DRAWINGS

The components in the drawings are not necessarily to scale relative to each other. Like reference numerals designate corresponding parts throughout the several views.

FIG. 1 is a block diagram illustrating an example networked environment in which embodiments of systems and methods for versatile video recording may be implemented, according to various example embodiments.

FIG. 2A is a timeline of an example recording of a video in which multiple in-points for the video are selected during recording of the video, according to various example embodiments.

FIG. 2B is a timeline of an example proposed recorded version of the video of FIG. 2A based on the multiple in-points for the video that were selected during recording of the video, according to various example embodiments.

DETAILED DESCRIPTION

Figure 3A:
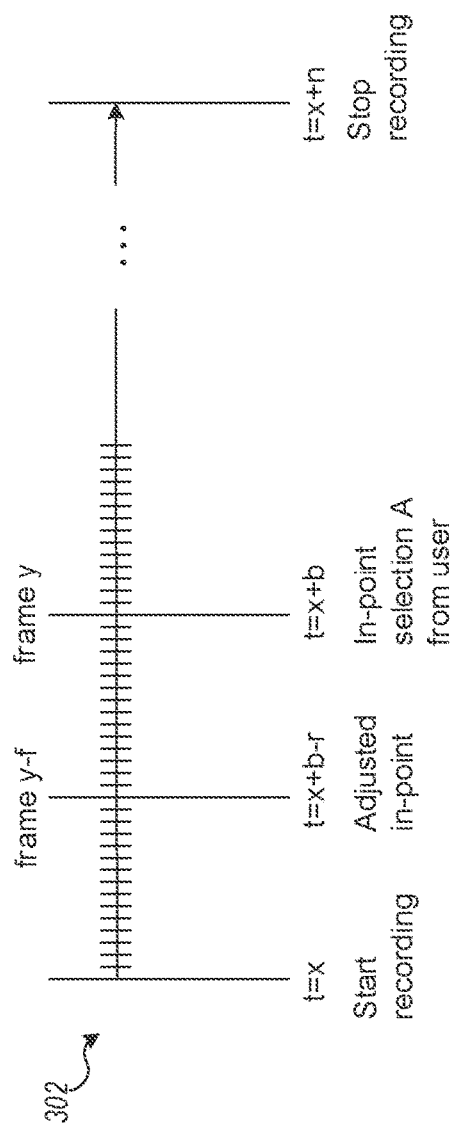
FIG. 3A is a timeline of an example recording of a video in which an in-point selected during recording of the video was subsequently adjusted, according to various example embodiments.

FIG. 1 is a block diagram illustrating an example networked environment 102 in which embodiments of systems and methods for versatile video recording may be implemented, according to various example embodiments. Shown in FIG. 1 is a video recorder 116, a video processing server 112, a video storage server 118, and a social media server 114 each operably connected to each other via communication system 108. Additional or different servers, systems, Internet of Things (IoT) devices and other devices may also be connected to and communicate with each other and one or more of the systems of FIG. 1 over communication system 108 in various embodiments.

The systems and methods described herein enable a user that is using their video recorder 116 to capture live action to effectively "re-start" the recording immediately by the press of a button after the user has already started recording. This is useful in many circumstances when the user is waiting for action or a specific moment to occur after starting recording and does not want to end up having to edit a long video that includes all the recorded video prior to that point. For example, instead of going back after stopping recording to find the recorded video on their video recorder 116, start the video, manually search in the video for the recorded moment they wanted to capture and then edit the video accordingly, the user presses a button during recording that results in designating or otherwise marking an in-point at which the recorded video is to start. After stopping the video, the original recorded video may be automatically edited or otherwise set to start at the in-point when played. Therefore, the speed, efficiency and usefulness of video recording systems is improved.

In other embodiments, the user may be provided options to keep the entire originally recorded video, adjust the in-point, or to have the video be automatically edited in response to some other action, such as uploading the video to a social media server 114 or video storage server 118. The user may press the button to "re-start" the recording multiple times during recording and the video recorder 116 or the video processing server 112 will use the most recent button press during recording to designate or otherwise mark the in-point at which the recorded video is to start.

In some embodiments, during or in response to stopping recording of the video, the video recorder 116 or video processing server 112 may make an adjustment to the in-point based on detected motion in the video before the selected in-point, such that the detected motion is included in the playing of the video from the adjusted in-point. An option may also be provided to the user to keep or discard such adjustments. Also, prior to or after recording the video, the user may select a recording mode according to a type of content that is being recorded that makes automatic or suggested adjustments to the in-point based on the selected mode.

In some embodiments, a "continuous" mode may be selected for recording videos in which the recorded video is edited or otherwise converted into separate clips after finally stopping recording based on the user pressing a button during recording to select an in-point to designate or otherwise mark a start of a clip and then pressing a button during recording to select an out-point to designate or otherwise mark an end of the clip. In some embodiments, the button pressed during recording to select an in-point may be converted to a button to select an out-point, and once an out-point is selected the button may be converted back to a button to select an in-point. The user may continue to do this selecting of in-points and out-points while recording, which will result in multiple separate video clips according to those selections after finally stopping recording.

In some embodiments, the video recorder 116 may communicate with the video processing server 112 during and/or after recording of the video such that the video processing server 112 may perform the actions that result in designating or otherwise marking the in-point at which the recorded video is to start and/or other actions described herein after stopping recording of the video, such as editing the video based on the selected in-point or otherwise setting the recorded video to start at the in-point when played.

In some embodiments, the video recorder 116 and/or video processing server 112 may include a machine learning or other artificial intelligence (AI) model that learns to adjust the in-point based on previous adjustments made by the user to previous in-points they selected during previous video recordings.

The video recorder 116 may be a digital video recorder or other type of video recorder in various embodiments. For example, the video recorder may be a digital video recorder that records, stores and plays digital video according to one or more various digital video encoding/compression techniques, formats and standards. Example digital video encoding/compression techniques include, but are not limited to, MPEG-2, MPEG-4 or HEVC. For example, MPEG-4 is a standard for a group of audio and video coding formats and related technology agreed upon by the ISO/IEC Moving Picture Experts Group (MPEG) (ISO/IEC JTC1/SC29/WG11) under the formal standard ISO/IEC 14496—Coding of audio-visual objects. One or more other digital video encoding/compression techniques, formats and and/or standards may be used in various embodiments. In various embodiments, the video recorder 116 may be, comprise, be part of, or be integrated with, one or more of: a camera, a video camera, a mobile device, a smartphone, a movie camera, a tablet device, a computer, a laptop computer, a notebook computer, a computing device, an IoT device, an action camera, a waterproof camera, a security camera, a security system, a camcorder, a dash cam, a monitoring device or system, a surveillance device or system, a drone, a digital video recorder (DVR), a set-top box (STB), a remote control device, a video editing device, a gaming device, a gaming console, etc.

The video recorder 116, video processing server 112, video storage server 118 and social media server 114 are operably connected to and may communicate with each other over communication system 108. Communication system 108 may include many different types of communication media. For example, communication system 108 may include communication networks or portions thereof, which implement and/or operably support one or more of the example types of electronic communication between video recorder 116, video processing server 112, video storage server 118 and social media server 114. Non-limiting examples include computer wireless fidelity (Wi-Fi) networks; cellular telephone networks, fifth generation (5G) technology standard for broadband cellular networks; telephony systems, the Internet; internets; intranets; local area network (LAN) systems; Internet Protocol (IP) systems; cloud computing systems, short-range wireless systems (e.g., Bluetooth systems); terrestrial television systems; digital terrestrial television (DTTV) systems; digital television terrestrial broadcasting (DTTB) systems; satellite television systems, cable systems; fiber optic systems; microwave systems; asynchronous transfer mode (ATM) systems; frame relay systems; digital subscriber line (DSL) systems; Digital Video Broadcasting (DVB) systems over cable, satellite, terrestrial and mobile networks, and other radio frequency ("RF") systems and satellite systems.

In some embodiments, communications over communication system 108 may be over one or more wired communications channels (e.g., twisted pair wiring, optical fiber) and/or wireless communications channels (e.g., radio, microwave, satellite, IEEE 801.11 compliant). Networked communications channels of communication system 108 may include one or more local area networks (LANs), wide area networks (WANs), extranets, intranets, or the Internet including the Worldwide Web portion of the Internet. For example, in one embodiment, video data may be sent between the video recorder 116 and the video storage server 118 directly over a LAN to which the video recorder 116 and the video storage server 118 are connected via a Wi-Fi connection while communications between video storage server 118 and the social media server 114 may be sent over the Internet via the Wi-Fi connection.

The above description of the networked environment 102 and the various devices therein, is intended as a broad, non-limiting overview of an example environment in which various embodiments of systems and methods for versatile video recording may be implemented. FIG. 1 illustrates just one example of a networked environment 102 and the various embodiments discussed herein are not limited to such environments. In particular, networked environment 102 and the various devices therein, may contain other devices, systems and/or media not specifically described herein.

Example embodiments described herein provide applications, tools, data structures and other support to implement how a system performs video recording and processes video recordings in a networked environment. In the following description, numerous specific details are set forth, such as data formats, code sequences, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described is not limited by the particular order, selection, or decomposition of steps described with reference to any particular module, component, or routine.

FIG. 2A is a timeline 202 of an example recording of a video in which multiple in-points for the video are selected during recording of the video, according to various example embodiments.

In the example shown, a user initiates recording a video capturing live action at time (t)=x. This may be, for example, by the user selecting a user interface element, such as a physical or touch screen button of the video recorder 116 of FIG. 1. The user may have started to record at t=x well before an anticipated activity started (a child's first steps) such as not to miss capturing it. The timeline 202 represents time moving forward from left to right as the video is being recorded to capture live action. In various embodiments, the time variable t may represent, correspond to, be given in units related to, or otherwise be based on, a presentation time stamp (PTS) an overall clock reference, such as a Program Clock Reference (PCR) or System Clock Reference (SCR), a time of day, a video frame number or some other time reference. The variable x may represent an actual time of day, a starting point in time, a time equal to or relative to an overall clock reference, such as a PCR or an SCR, a frame number or a time relative to some other starting point. In some embodiments, x may be equal to zero at the starting of the recording of the video.

At t=x+a during recording of the video (a units of time after starting of the recording) the user selects an in-point represented in FIG. 2A by in-point selection A. For example, at a units of time after starting of the recording of the video, the user may have noticed their child standing up and what they thought was the beginning of their child taking their first steps. However, the child instead sits down at t=x+a during recording of the video and actually begins to walk instead at t=x+b (b units of time after starting of the recording), so the user selects another in-point (in-point selection B) at t=x+b during recording. After capturing their child taking their first steps, the user stops recording and t=x+n (n units of time after starting of the recording).

The user may have indicated the in-points (e.g., in point selection A and in-point selection B) by selection of a dynamic in-point selection user interface element on the video recorder 116. For example, this may be a physical or virtual button, switch, dial, lever, knob, menu item, or other selectable physical or virtual user interface element. In some embodiments, a voice command may be used in addition to or instead of the dynamic in-point selection user interface element. The specific voice command (e.g., "re-start", "re-take" or some other unusual or unique word or phrase) may be automatically detected and removed or filtered out by the video recorder 116 in a recorded version of the video.

The selection of the dynamic in-point selection user interface element is associated with the live action (e.g., the child's first steps) that is being recorded at a time at which the indication of the selection of the dynamic in-point selection user interface element is received. In response to receiving the indication of the selection of the dynamic in-point selection user interface element, during the recording of the video, the video recorder 116 electronically stores a marker that indicates the in-point of the video being recorded. The marker may be associated with the time at which the indication of the selection of the dynamic in-point selection user interface element was received. For example, a marker for in-point selection A may be associated with t=x+a and in-point selection B may be associated with t=x+b.

The in-point and/or associated marker may also or instead correspond to, or otherwise be associated with, a video frame that was recorded and/or presented at a time during the recording of the video when the in-point was selected. In one embodiment, a marker that indicates the in-point of the video being recorded indicates a frame of the video being recorded which was being displayed on the user interface of the video recorder 116 at the time at which the indication of the selection of the dynamic in-point selection user interface element was received during recording of the video. For example, the marker that indicates the in-point selection B indicates frame y of the video being recorded which was being displayed on the user interface of the video recorder 116 at the time t=x+b at which the indication of the selection of the dynamic in-point selection user interface element was received during recording of the video. The variable y may represent a chronological frame number or other identification of the frame of the video being recorded which was being displayed on the user interface of the video recorder 116 at the time t=x+b. In some embodiments, the frame of the video being recorded at the time the indication of the selection of the dynamic in-point selection user interface element was received was not being displayed (e.g., in video cameras that do not displayed the video while it is being recorded). In such embodiments, the marker just indicates the frame of the video being recorded at the time the indication of the selection of the dynamic in-point selection user interface element was received.

In some embodiments, such as when the video recorder 116 and/or video processing server 112 is processing compressed digital video to set a marker to indicate an in-point or out-point, the marker that indicates the in-point or out-point of the video being recorded indicates a closest previous I-frame to a frame of the video being recorded which was being displayed on the user interface at the time at which the indication of the selection of the dynamic in-point or out-point selection user interface element was received. An I-frame is an intra-coded picture which is a complete image and thus does not require other video frames to decode. Therefore, using the closest I-frame when processing compressed digital video to set the marker may increase speed and efficiency of generating a playable version of the video starting from (or approximately from) the selected in-point and ending at (or approximately at) the selected out-point. The markers, the corresponding times and video frames (or indications thereof), and the associations of the markers with these corresponding times and video frames may be stored by the video recorder 116, the video processing server 112 and/or the video storage server 118. However, when the video recorder 116 and/or video processing server 112 is processing uncompressed digital video to set a marker to indicate an in-point or out-point, the marker that indicates the in-point or out-point of the video being recorded may be set to indicate the frame of the video being recorded which was being displayed on the user interface at the time at which the indication of the selection of the dynamic in-point or out-point selection user interface element was received.

FIG. 2B is a timeline 204 of an example proposed recorded version of the video of FIG. 2A based on the multiple in-points for the video that were selected during recording of the video, according to various example embodiments. After the user stops recording the video at t=x+n in FIG. 2A, the video recorder 116 or video processing server 112 presents to the user for selection a proposed recorded version of the video (or link thereto) that starts at the point of recorded action where the child actually begins to walk based on the most recent selected in-point, which is in-point selection B, and stops at a point when the user stopped recording represented by t=x+n. Thus, the undesired portion of the video before the child starts to make their first steps is excluded from the proposed recorded version of the video without the user having to perform any additional operations and thus improves the technology of digital video recorders. In various embodiments, the user may be provided an option to confirm or reject the proposed recorded version of the video. In some embodiments, in response to the user confirming or otherwise accepting the proposed recorded version of the video, the other portions of the recorded video that are not included in the proposed recorded version of the video are deleted.

The video recorder 116 may, during the recording of the video, update a marker to indicate an in-point of the video being recorded associated with a time at which the most recent indication of the selection of the dynamic in-point selection user interface element was received. In some embodiments, during recording of the video, the video recorder 116 may initially set a marker to indicate in-point selection A at t=x+a and then update the marker to indicate subsequent in-point selection B from the user at t=x+b. In other embodiments, the video recorder 116 may, during the recording of the video, store multiple markers (one for each in-point selection) and then after the recording is stopped, determine to use the marker associated with the most recent in-point selection that was made during recording of the video. For example, during recording of the video, the video recorder 116 may store a marker indicating in-point selection A at t=x+a and then store an additional marker indicating in-point selection B at t=x+b. Then, after the recording is stopped at t=x+n, the video recorder 116 will determine to use the marker indicating in-point selection B because it is the most recent in-point selection that occurred during recording of the video.

Thus, in the present example, the proposed recorded version of the video starts at a time within the recorded video indicated by t=x+b or at frame within the recorded video (frame y) designated by or otherwise associated with the marker indicating in-point selection B stored in response to receiving the indication of the selection of the dynamic in-point selection user interface element at t=x+b during recording of the video. In some embodiments, the video recorder 116 then receives an indication to delete all portions of the video that are not included in the recorded version of the video that starts based on the determined in-point selection B. In response to receiving the indication, the video recorder 116 or video recorder processing server 112 may delete all portions of the video that are not included in the proposed recorded version of the video.

In some embodiments, such editing may be performed automatically in response to the stopping of the recording of the video at t=x+n, viewing or playing of the recording of the video, viewing or playing of the recording of the video a particular number of times, sharing the video online, posting the video online to a social media site, and/or uploading of the video, or instead in response to any one or combination of one or more of various other received indications. For example, in some embodiments, the indication to delete all portions of the video that are not included in the proposed recorded version of the video may be selected from the group consisting of: user input indicating to delete all portions of the video that are not included in the proposed recorded version of the video; viewing of the proposed recorded version of the video; viewing a particular number of times of the proposed recorded version of the video; uploading of the proposed recorded version of the video (e.g., to the video storage server 118); posting to an online social media server or web site (e.g., to social media server 114) the proposed recorded version of the video; saving to a specific protected location the proposed recorded version of the video (e.g., to a specific protected location on video recorder 116 or video storage server 118); age of the proposed recorded version of the video; saving to a specific protected location the proposed recorded version of the video; available memory capacity (e.g., of the video recorder 116 or video storage server 118) reaching a minimum threshold; and a particular amount of time passing since the video was recorded (a day, one week, two weeks, a month, etc.). In some embodiments, the video recorder 116 or video recorder processing server 112 may never delete portions of the video that are not included in the proposed recorded version of the video until receiving user input indicating to do so.

FIG. 3A is a timeline 302 of an example recording of a video in which an in-point selected during recording of the video was subsequently adjusted, according to various example embodiments. For example, such an adjustment may be made in order to avoid excluding in the proposed recorded version of the video desired action that was recorded at some point before the initial in-point selection was received (e.g., before the selection of the dynamic in-point selection user interface element was received during recording of the video).

In the present example, the user initially selected an in-point represented by in-point selection A at t=x+b associated with frame y within the recorded video. During or after recording of the video, an adjustment is made to the in-point selection A to adjust it r time units to t=x+b−r within the recorded video or f frames to frame y−f (or a closest I-frame thereto) within the recorded video. In various embodiments, the adjustment may be made by the video recorder 116 or the video processing server 112 (either automatically or in response to user input) based on one or more various factors. In some embodiments, adjusting the in-point r time units may correspond to or be the result of moving the in-point to frame y−f. In other embodiments, adjusting the in-point f frames may correspond to or be the result of adjusting the in-point r time units to t=x+b−r within the recorded video.

In one example embodiment, the r time units or f number of frames by which the in-point is adjusted may be predetermined before, during or after recording. For example, the marker that indicates the adjusted in-point of the video being recorded may be set to indicate a frame of the video that was recorded or displayed at a predetermined amount of time r (e.g., one or two seconds) that is before the time t=x+b at which the indication of the selection of the dynamic in-point selection user interface element was received during recording of the video. In some embodiments, the video recorder 116 or video processing server 112 may present a selectable option for the user to select a specific amount of time to be the predetermined amount of time used to adjust the in-point. In response to presenting the selectable option, the video recorder 116 or video processing server 112 may receive an indication of a selected specific amount of time to be the predetermined amount of time. The video recorder 116 or video processing server 112 will then set the predetermined amount of time r to be the selected specific amount of time.

In some embodiments, the predetermined amount of time may be based on a detected location of the video recorder 116 (based on a global positioning system (GPS) signal or other location data) or on a particular time the video recorder 116 was at the particular location. For example, if the detected location of the video recorder 116 is at a sports arena or stadium during a football game, the predetermined amount of time by which to adjust the initial in-point selection may be longer to capture the teams lined up on the line of scrimmage well before the snap to account for the increased amount or length of time where there is little no motion before the snap prior to the initial in-point selection that may have occurred at or near the snap. In some embodiments, the predetermined amount of time may be based on selection by the user of a recording mode associated with a type of content of video to be recorded. For example, the user may select from category types such as "home video", "baseball", "basketball", "football", "sports" (generally), "kids", "concerts", "dance", "outdoor activities", "holidays", "movie production", etc., that may each have different times by which an in-point selection that is initially made by a user is to be adjusted and different triggers or types of motion detected in the video on which an adjustment may be based. For example, during music concerts there is typically frequent or near constant movement on the stage, so in a "concerts" recording mode, the video recorder 116 will not use motion detection to detect motion in the video prior to the initial in-point selected by the user to trigger adjustment of that in-point to capture that motion.

As an additional example, for the football category, the in-point may be adjusted to capture a detected snap (or moment before the snap) if it occurred within a particular window of time (e.g., 0.5 seconds or less) before the in-point was selected by the user. Also, the video recorder 116 may detect that at the time the in-point was selected by the user, there was no motion detected in the video being recorded. In response, the video recorder 116 may search within a particular time window before the in-point for motion or a particular type of motion (e.g., a snap). The video recorder 116 may then adjust the in-point so that the snap is captured. For the baseball category, the in-point may be adjusted to capture a detected swing of a bat or catch of a fly ball if it occurred within a particular window of time (e.g., 1 second or less) before the in-point was selected by the user. The video recorder 116 may also provide an option via a user interface for the user to select to confirm any adjustments to the in-point selection. Performance of such adjustments may be based on an option to do so pre-selected by the user via a user interface of the video recorder 116. Also, the user may be provided a selectable option to confirm, adjust or reject such adjustments after they have been made.

In some embodiments, after stopping recording of the video, the video recorder 116 or video processing server 112 may provide a graphical in-point adjustment user interface in which the user may be directed to the current in-point that was selected by the user during recording of the video (or the current in-point as adjusted by the video recorder 116) and will display the associated video frames of the recorded video surrounding the in-point selection. The user may then visually adjust the in-point selection (e.g., by sliding a visual marker left or right) to be placed on or adjacent to the desired frame (e.g., frame y−f) or time point (e.g., t=x+b−r) within the recorded video. The in-point and corresponding marker will then be adjusted accordingly to indicate the time and/or frame to which the visual marker was adjusted.

In some embodiments, the predetermined amount of time by which to adjust the in-point selection made by the user may be determined by the video recorder 116 or video processing server 112 based on a predicted amount of time, such as from a machine learning model or other AI model of the video recorder 116 or video processing server 112, that is trained on a plurality of previous adjustments made in response to user input to previous markers that each indicated a respective in-point of a respective video being recorded. For example, if a particular user is habitually adjusting the in-point selected by the user to an r amount of time units (or a moving average or range of r amount of time units) or f number of frames (or a moving average or range of f number of frames) prior to the in-point for videos particularly when the video recorder 116 is detected to be at the user's home during recording of the videos, then the machine learning model may predict that future adjustments are to be made to the user selected in-point of an r amount of time units or f number of frames for those videos recorded while the video recorder 116 was detected to be at the user's home.

In one example embodiment, the video recorder 116 or video processing server 112 may receive user input making an adjustment to the in-point after the stopping of recording of the video at t=x+n, and then train a machine learning model based on the adjustment to perform a prediction of adjustments of one or more subsequent in-points selected by the user for one or more corresponding subsequent video recordings. The video recorder 116 or video processing server 112 may thereafter automatically or preemptively perform adjustments to the one or more subsequent in-points based on the prediction during or in response to stopping recording of the one or more corresponding subsequent video recordings. Subsequent manual adjustments to those adjustments made by the machine learning model may then be provided in a feedback loop to the machine learning model to calculate future predictions and associated adjustments. In some embodiments, particular user adjustments that are outside a particular range (e.g., adjustments made by the user to the in-point by more than 6 seconds) may be disregarded as anomalies and not considered by the machine learning model.

Figure 3B:
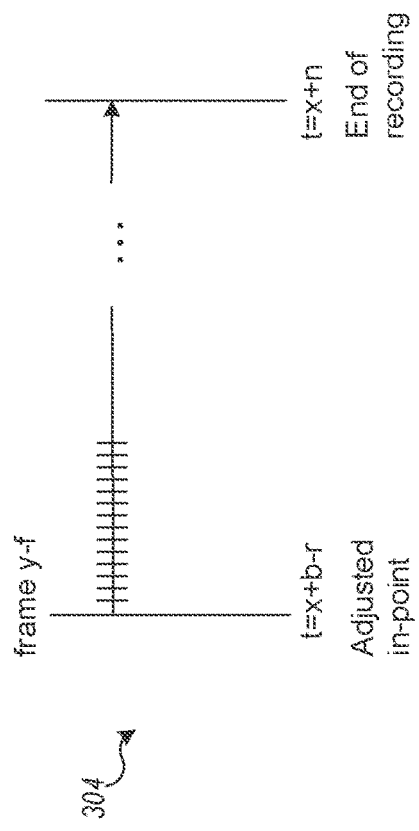
FIG. 3B is a timeline of an example proposed recorded version of the video of FIG. 3A based on the adjusted in-point of FIG. 3A, according to various example embodiments.

FIG. 3B is a timeline 304 of an example proposed recorded version of the video of FIG. 3A based on the adjusted in-point of FIG. 3A, according to various example embodiments. The proposed recorded version of the video or link thereto is presented by the video recorder 116 or video processing server 112 and starts at frame y−f within the recorded video or at t=x+b−r within the recorded video according to the adjusted in-point as described above with respect to FIG. 3A and ends when the user stopped recording the video at t=x+n. In various embodiments, the user may be provided an option to confirm or reject the adjusted in-point after being presented with the proposed recorded version of the video. In some embodiments, in response to the user confirming or otherwise accepting the adjusted in-point, the other portions of the recorded video that are not included in the proposed recorded version of the video will be deleted.

Figure 4A:
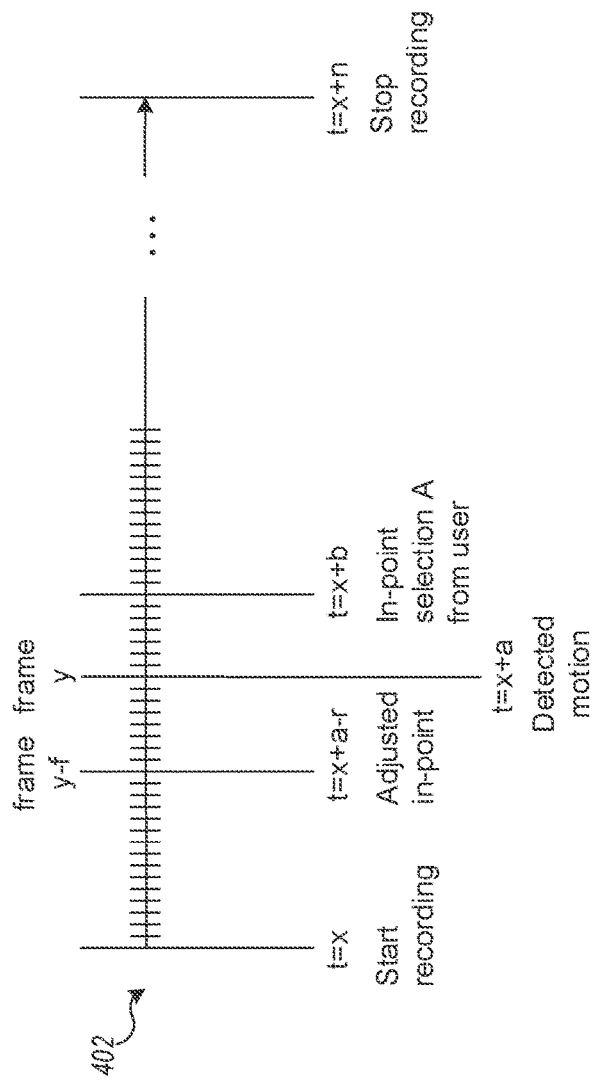
FIG. 4A is a timeline of an example recording of a video in which an in-point selected during recording of the video was subsequently adjusted based on detected motion in the video, according to various example embodiments.

FIG. 4A is a timeline 402 of an example recording of a video in which an in-point selected during recording of the video was subsequently adjusted based on detected motion in the video, according to various example embodiments. During or in response to stopping recording of the video, the video recorder 116 or video processing server 112 may make an adjustment to the in-point based on detected motion in the video before the in-point, such that the detected motion is included in the playing of the video from the in-point. The detected motion may be performed by video motion detection, which is a way of defining activity in a scene by analyzing the differences that occur (e.g., in macroblocks) in a series of images. This may be performed by pixel matching or frame referencing. A change between frames may be regarded as a detection of motion. Also, the detected motion may include, and the adjustment to the in-point may be based on, detection of a specific type of motion (e.g., walking, running or throwing) or motion of a specific object (a basketball or baseball) identified by object detection functionality, computer vision and/or video analytics of the video recorder 116 or video processing server 112.

In the example shown in FIG. 4A, the initial in-point selection of the user is in-point selection A at t=x+b. However, during or after recording of the video, the video recorder 116 or video processing server 112 detected motion (or a particular type of motion) at t=x+a or including frame y within in the recorded video prior to the location within the recorded video indicated by in-point selection A. In some embodiments, the video recorder 116 or video processing server 112 may search for motion within a specific amount of time or video frames (e.g. 2 seconds or 60 frames) before each in-point selection made by the user. This specific amount of time may also be selectable by the user. During or after recording of the video, the video recorder 116 or video processing server 112 then adjusts the in-point a predetermined amount of time r (to t=x+a−r) or a predetermined number of frames f (to y−f) before the point in the recorded video at which the motion was detected. This predetermined amount of time or number of frames may also be based on, or determined in the manner similar to, the predetermined amount of time to adjust the in-point described herein with respect to FIG. 3A and FIG. 3B.

Figure 4B:
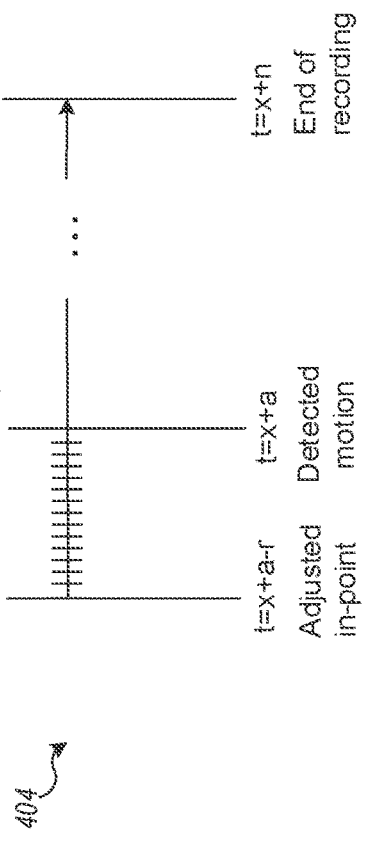
FIG. 4B is a timeline of an example proposed recorded version of the video of FIG. 4A based on the adjusted in-point of FIG. 4A, according to various example embodiments.

FIG. 4B is a timeline 404 of an example proposed recorded version of the video of FIG. 4A based on the adjusted in-point of FIG. 4A, according to various example embodiments. The proposed recorded version of the video or link thereto is presented by the video recorder 116 or video processing server 112 and starts at frame y−f within the recorded video or at t=x+a−r within the recorded video according to the adjusted in-point as described above with respect to FIG. 4A and ends when the user stopped recording the video at t=x+n. In various embodiments, the user may be provided an option to confirm or reject the adjusted in-point after being presented with the proposed recorded version of the video. In some embodiments, in response to the user confirming or otherwise accepting the adjusted in-point, the other portions of the recorded video that are not included in the proposed recorded version of the video will be deleted.

Figure 5A:
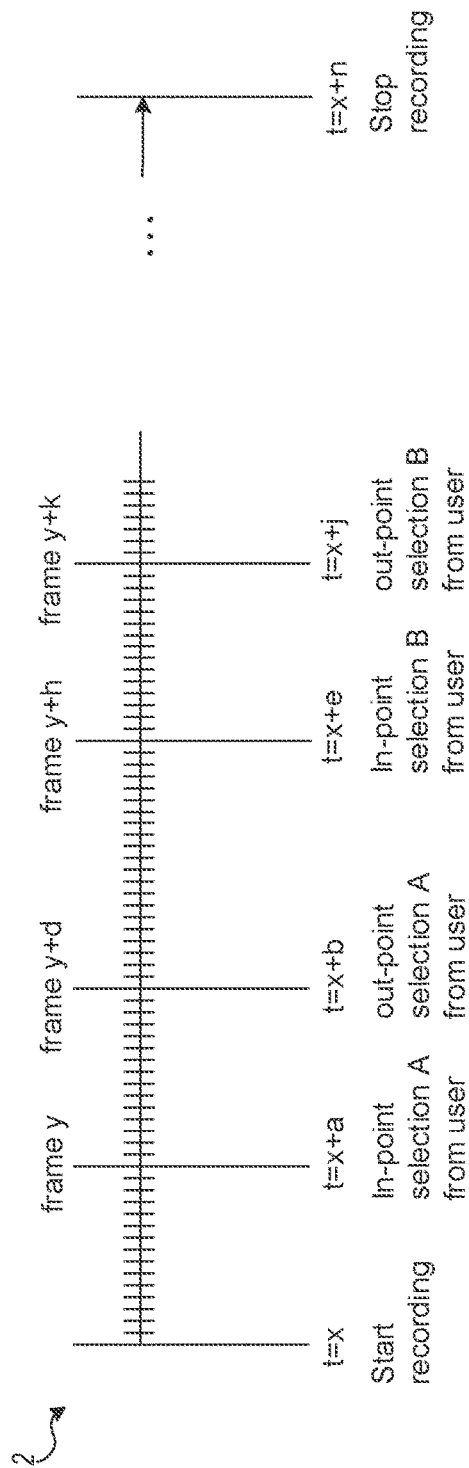
FIG. 5A is a timeline of an example continuous recording of a video in which multiple in-points and multiple outpoints for the video are selected during recording of the video, according to various example embodiments.

FIG. 5A is a timeline 502 of an example continuous recording of a video in which multiple in-points and multiple outpoints for the video are selected during recording of the video, according to various example embodiments. In an example embodiment, the video recorder 116 or video processing server 112 may provide via a user interface an option for a user to select a "continuous" mode for recording videos in which the recorded video is edited or otherwise converted into separate clips after stopping recording based on the user pressing a selectable user interface element during recording to select an in-point to designate or otherwise mark a start of a clip and then pressing a selectable user interface element during recording to select an out-point to designate or otherwise mark an end of the clip. The user may continue to do this selecting of in-points and out-points while recording, which will result in multiple separate video clips according to those selections after finally stopping recording.

In the example shown in FIG. 4A, the user makes in-point selection A at t=x+a during recording of the video which corresponds to frame y in the recorded video. The user then makes out-point selection A at t=x+b during recording of the video which corresponds to frame y+d in the recorded video, which is sequentially d number of frames after frame y. While still recording the video, the user makes in-point selection B at t=x+e during recording of the video which corresponds to frame y+h in the recorded video, which is sequentially h number of frames after frame y. In fact, there may be a significant gap in time between out-point selection A and in-point selection B during recording of the video. The user then makes out-point selection B at t=x+j during recording of the video which corresponds to frame y+k in the recorded video, which is sequentially k frames after frame y. The user then stops recording the video at t=x+n. In various embodiments, the selection of additional in-points and corresponding out-points may continue until the user provides input to finally stop the recording of the video at t=x+n.

In some embodiments, the user may make groups of consecutive in-point selections during recording of the video. In such embodiments, for each group of consecutively selected in-points, a corresponding determined in-point for a corresponding video clip may be determined by the video recorder 116 or video processing server 112 to be a most recently selected in-point of the group during recording of the video. Alternatively, the current in-point selection may be updated as each new in-point is selected before the next out-point is selected (or the user stops recording). Once the next out-point is selected (or the user stops recording) that currently updated in-point is saved and associated with a start of a corresponding video clip.

Also, the user may make groups of consecutive out-point selections. In such embodiments, for each group of consecutively selected out-points, a corresponding determined out-point for a corresponding video clip may be determined by the video recorder 116 or video processing server 112 to be a most recently selected out-point of the group during recording of the video. Alternatively, the current out-point selection may be updated as each new out-point is selected before the next in-point is selected (or the user stops recording). Once the next in-point is selected (or the user stops recording) that currently updated out-point is saved and associated with an ending of a corresponding video clip. Also, in some cases the user may not make an out-point selection after a final in-point selection. In such a case, the end of the video clip that starts at the final in-point selection is the point at which the user stops recording. Also, in some cases the user may not make an in-point selection before an initial out-point selection. In such a case, the beginning of the video clip that ends at the initial out-point selection is the point at which the user initially started recording.

Figure 5B:
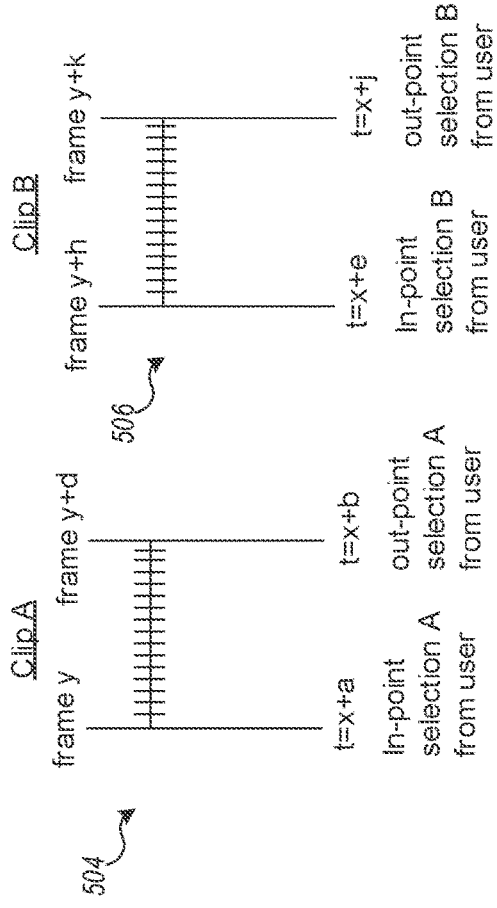
FIG. 5B includes timelines of example proposed recorded video clips of the video of FIG. 2A based on the multiple in-points and multiple outpoints for the video that were selected during recording of the video, according to various example embodiments.

FIG. 5B includes timelines 504 and 506 of example proposed recorded video clips of the video of FIG. 2A based on the multiple in-points and multiple outpoints for the video that were selected during recording of the video, according to various example embodiments. The video clip A 504, or a link thereto, is presented by the video recorder 116 or video processing server 112 and starts at frame y within the recorded video or at t=x+a within the recorded video according to in-point selection A and ends at frame y+d within the recorded video or at t=x+b within the recorded video according to out-point selection A described above with respect to FIG. 5A. The video clip B 506, or a link thereto, is presented by the video recorder 116 or video processing server 112 and starts at frame y+h within the recorded video or at t=x+e within the recorded video according to in-point selection B and ends at frame y+k within the recorded video or at t=x+j within the recorded video according to out-point selection B described above with respect to FIG. 5A. Additional video clips may be presented based on additional in-points and corresponding out-points selected during recording of the video. In various embodiments, the user may be provided an option to adjust confirm or reject the proposed video clips, or in-points and out-points associated therewith, after being presented with the proposed recorded version of the video. In some embodiments, in response to the user confirming or otherwise accepting the proposed video clips, other portions of the recorded video will be deleted.

Figure 6:
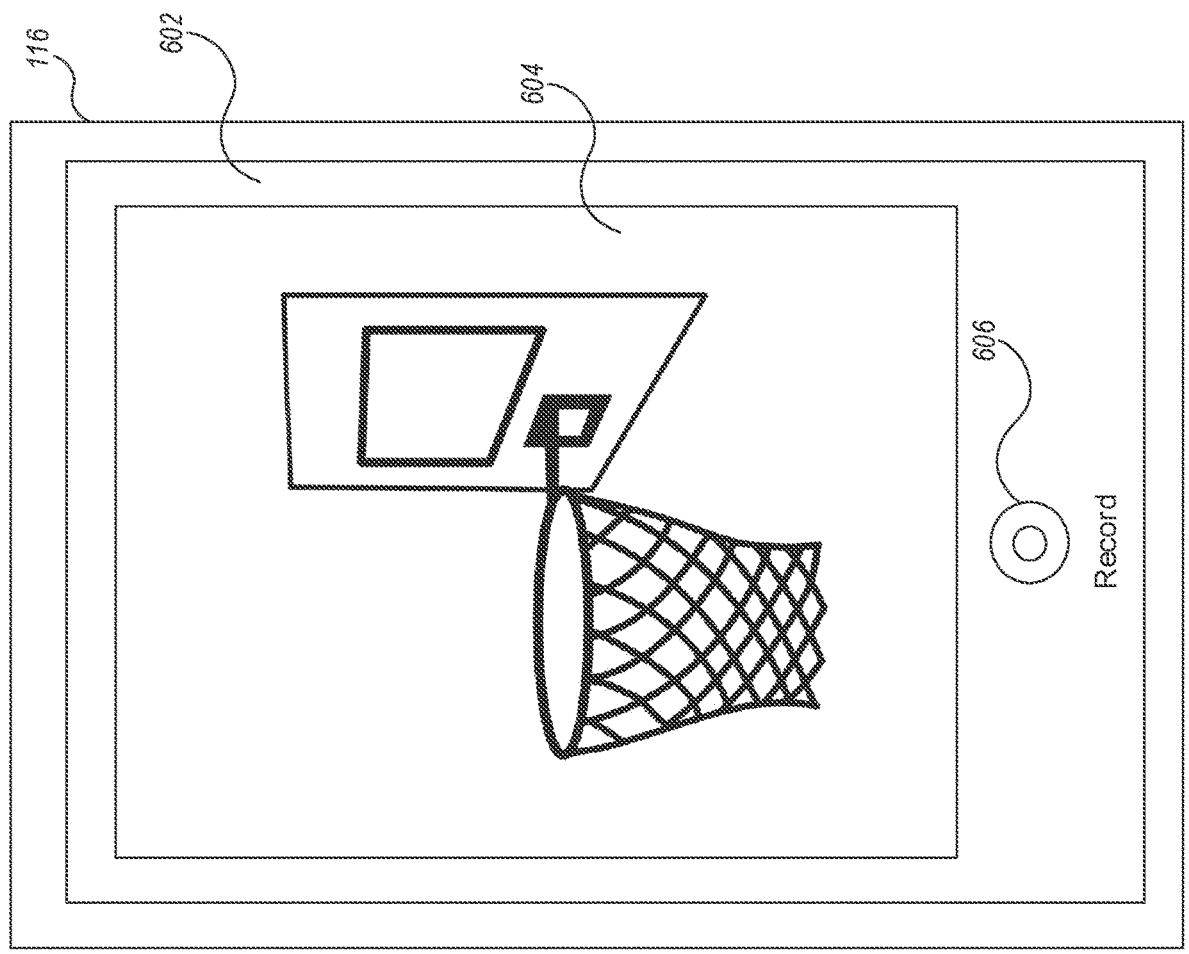
FIG. 6 is an example user interface on a video recorder showing an example state of the user interface before recording starts, according to various example embodiments.

FIG. 6 is an example graphical user interface (GUI) 602 on a video recorder 116 showing an example state of the user interface before recording starts, according to various example embodiments. The GUI 602 is an example user interface that may be generated and output by the video recorder 116 to implement the systems and methods for versatile video recording described herein. In the present example, the video recorder 116 is a wireless mobile device and the user is aiming a camera (not shown) of the video recorder 116 at the live action of a basketball game. Video of the basketball game is appearing on the video screen portion 604 of the GUI 602, but the user has yet to start recording by pressing the record button 606 on the GUI 602.

Figure 7:
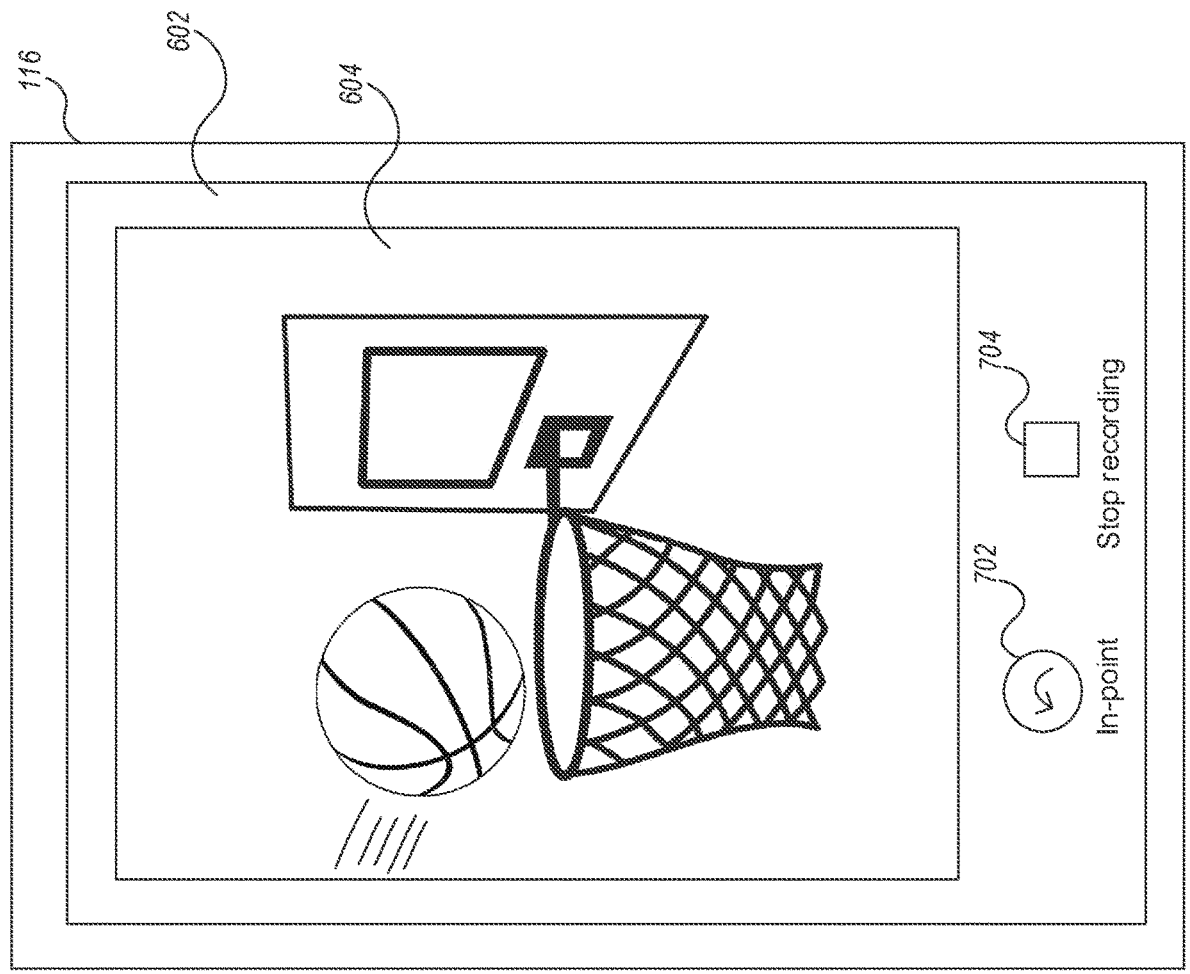
FIG. 7 is an example user interface on a video recorder showing an example state of the user interface after recording starts, according to various example embodiments.

FIG. 7 is the example GUI 602 on the video recorder 116 showing an example state of the GUI 602 after recording starts, according to various example embodiments. In the present example, the user has pressed the record button 606 shown in FIG. 6 on the GUI 602 and started recording the live action of the basketball game. In response, the video recorder 116 removes the record button 606 and replaces it with an a dynamic in-point selection user interface element 702 and a stop recording button 704 while displaying on the video screen portion 604 the live action of the basketball game that is being recorded during the video recording. The dynamic in-point selection user interface element 702 may be identified as such by a particular emblem or marking (e.g., an arrow), color, shape, or other visual indication differentiating it from other user interface elements.

During the recording of the video, the video recorder 116 receives an indication of selection of the dynamic in-point selection user interface element 702. The selection of the dynamic in-point selection user interface element 702 is associated with the live action (e.g., the basketball entering the hoop) that is being recorded at a time at which the indication of the selection of the dynamic in-point selection user interface element 702 is received. For example, in response to receiving the indication of the selection of the dynamic in-point selection user interface element 702, during the recording of the video, the video recorder 116 electronically stores a marker that indicates an in-point of the video being recorded. The marker may be associated with the time at which the indication of the selection of the dynamic in-point selection user interface element 702 was received and/or a video frame that was being recorded or displayed on the video screen portion 604 at the time at which the indication of the selection of the dynamic in-point selection user interface element 702 was received. The user may continue recording the basketball game, selecting new in-points to replace the previously selected in-points until the user stops recording by selecting the stop recording button 704.

Also, in some embodiments, the video recorder 116 may treat the selection of the stop recording button 704 as selection of an out-point and keep recording for a particular amount of time (which may be selectable by the user) before actually stopping recording. This may be to capture video in case the user has accidentally or prematurely pressed the stop recording button 704. The user may then be provided, via the GUI 602, an option to accept, reject or adjust the out-point to capture or exclude the action that was missed after pressing of the stop recording button 704.

In alternative embodiments, there may be a single button provided on the GUI 602 during recording of the video to control both the in-point selection and stopping of the video recording. For example, a short or normal press may be used to indicate an in-point selection and a long press on the same button may be used to stop the video recording. An operating mode to enable this embodiment using a single button to control both the in-point selection and stopping of the video recording may be provided for a user to select via the GUI 602. Other gestures and button arrangements, and combinations thereof, may be used in various other embodiments to implement the control of the video recording and the in-point selection via the GUI 602.

Figure 8:
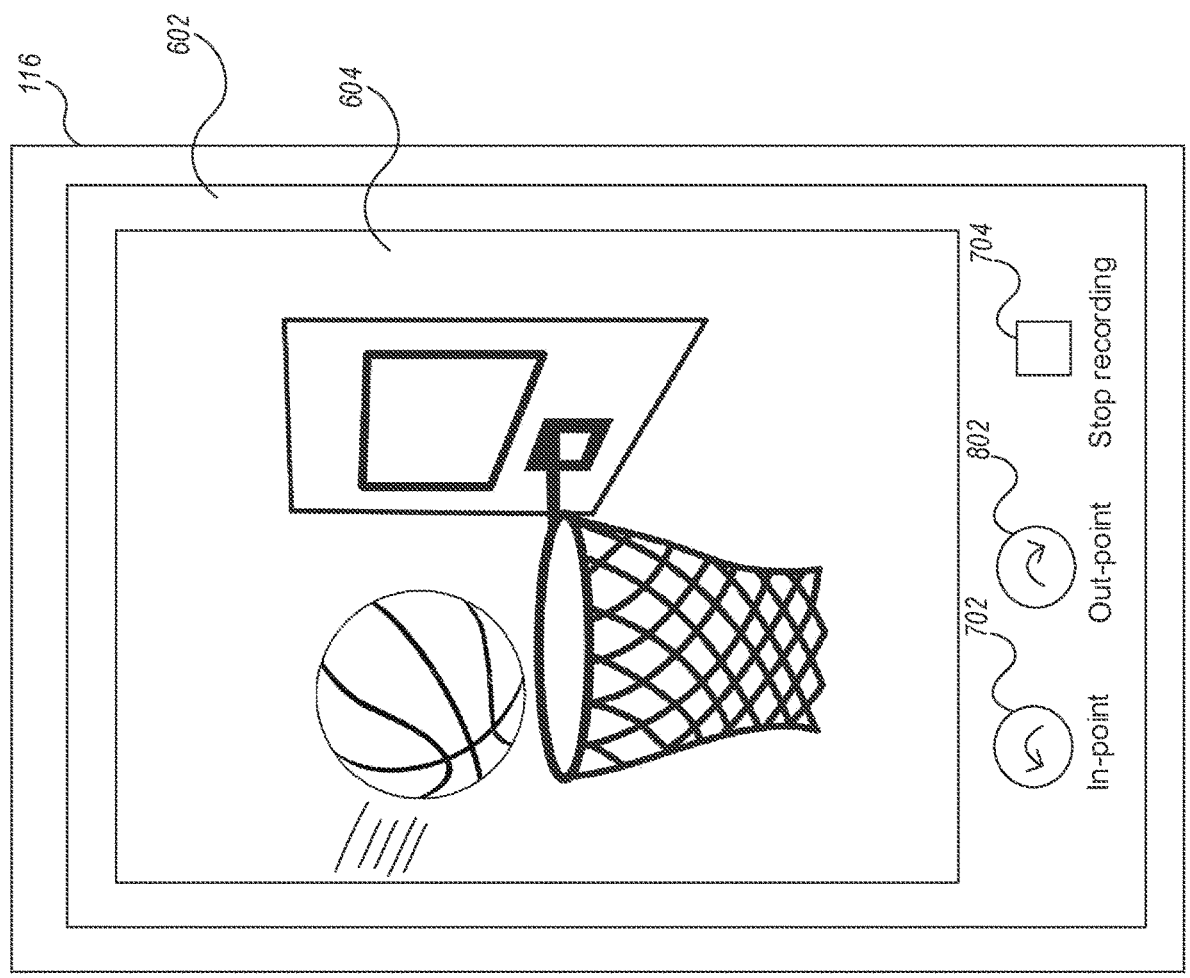
FIG. 8 is an example user interface on a video recorder showing an example state of the user interface after recording starts, according to various alternative example embodiments.

FIG. 8 the example GUI 602 on the video recorder 116 showing an example state of the GUI 602 after recording starts, according to various alternative example embodiments. The present example, the user has pressed the record button 606 shown in FIG. 6 on the GUI 602 and started recording the live action of the basketball game. In response, the video recorder 116 removes the record button 606 and replaces it with a dynamic in-point selection user interface element 702, a dynamic out-point selection user interface element 802 and a stop recording button 704 while displaying on the video screen portion 604 the live action of the basketball game that is being recorded during the video recording.

The GUI 602 shown in FIG. 8 is an example GUI displayed in an alternative continuous recording mode entered after the user selected the record button 606 of FIG. 6 in which multiple in-points and multiple outpoints for the video may be selected during recording of the video. For example, the video recorder 116 may have previously provided, via a user interface, an option for the user to select a "continuous" mode for recording videos. In the "continuous" mode for recording videos, the recorded video is edited or otherwise converted into separate clips after stopping recording by pressing of the stop recording button 704 based on the user pressing the dynamic in-point selection user interface element 702 during recording to select an in-point to designate or otherwise mark a start of a clip and then pressing the dynamic out-point selection user interface element 802 during recording to select an out-point to designate or otherwise mark an end of the clip. The user may continue to do this selecting of in-points and out-points using the in-point selection user interface element 702 and out-point selection user interface element 802 respectively while recording, which will result in multiple separate video clips according to those selections after stopping recording by pressing the stop recording button 704.

In some embodiments, a single button or selectable user interface element may be used to select both in-points and out-points. For example, the dynamic in-point selection user interface element 702 selected during recording to select an in-point may be converted to the dynamic out-point selection user interface element 802 to select an out-point, and once an outpoint is selected, the dynamic out-point selection user interface element 802 may be converted back to dynamic in-point selection user interface element 702. However, in this embodiment, after starting recording, the user has just one chance to select an in-point for each clip and one chance to select an out-point for each clip during recording. Also, in some embodiments, the same selectable user interface element may be used to stop recording (e.g., via a long-press of the selectable user interface element). Thus, the same button or selectable user interface element may be used to select in-points and out-points and to stop recording.

There are also alternative embodiments using a single button provided on the GUI 602 during recording of the video to control both the in-point selection and the out-point selection during recording. For example, a short press may be used to indicate an in-point selection and a long press on the same button may be used to indicate an out-point selection. Other gestures and button arrangements and combinations thereof may be used in various other embodiments to implement the control of the video recording and the in-point and out-point selections via the GUI 602.

Figure 9A:
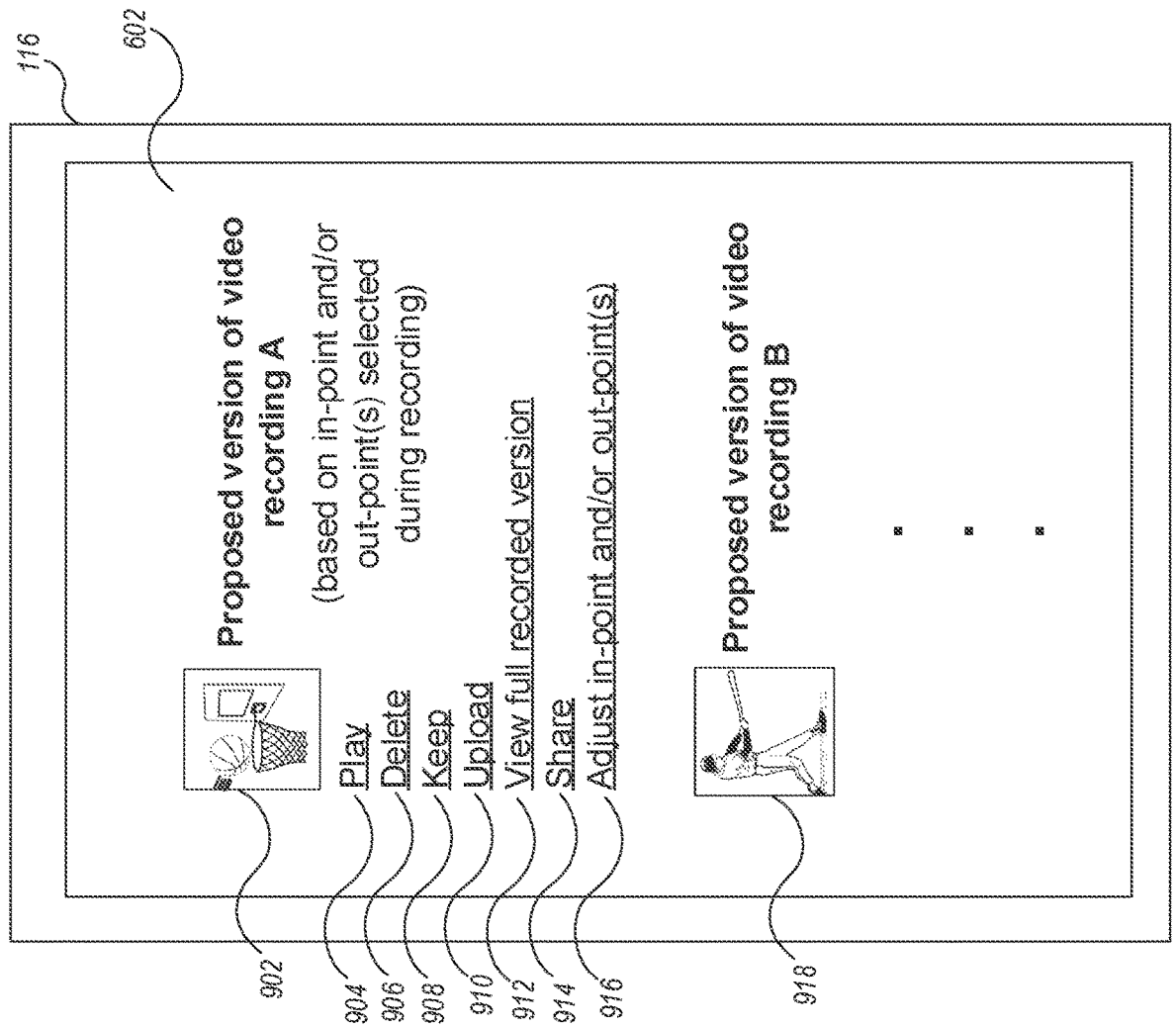
FIG. 9A is an example user interface on a video recorder showing an example state of the user interface after recording stops and a user selects an option to view proposed versions of recorded videos based on in-point and/or outpoint(s) selected during recording, according to various example embodiments.

FIG. 9A is an example GUI 602 on video recorder 116 showing an example state of the GUI 602 after recording stops and a user selects an option to view proposed versions of recorded videos based on in-point and/or out-point(s) selected during recording, according to various example embodiments. After or in response to stopping recording of the video, such as by pressing the stop recording button 704 of FIG. 7 or FIG. 8, the user may be presented on the GUI 602 a user interface element 902 that indicates the proposed version of video recording A based on the in-points and/or out-points selected during recording. Also presented is a plurality of associated selectable user interface elements to access or interact with the proposed version of video recording A.

Figure 9B:
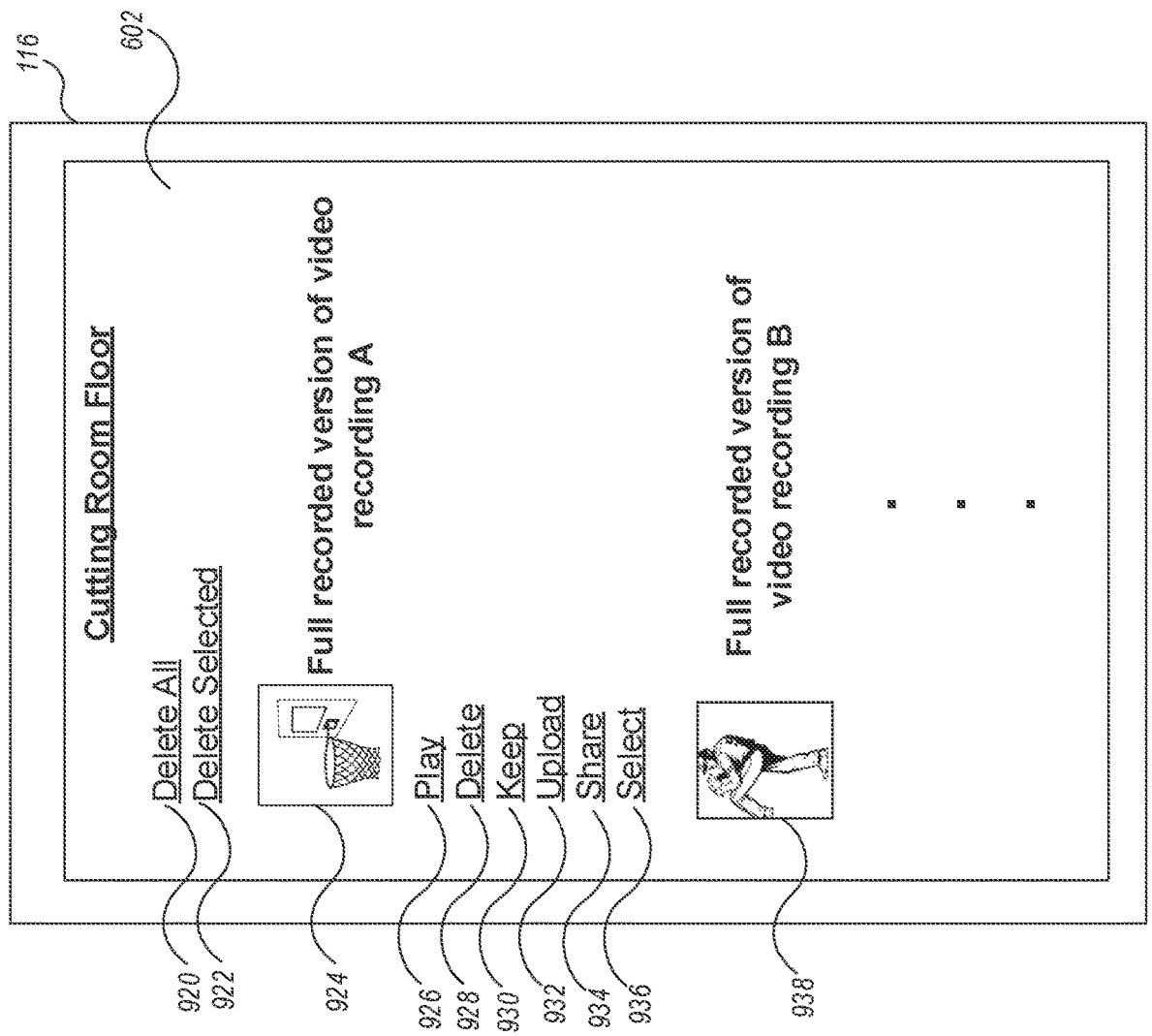
FIG. 9B is an example user interface on a video recorder showing an example state of the user interface after a user selects an option to view full recorded versions of recorded videos, according to various example embodiments.

In the present example shown in FIG. 9A, displayed is a link or other selectable user interface element 904 to play the proposed version of video recording A, a link or other selectable user interface element 906 to delete the proposed version of video recording A, a link or other selectable user interface element 908 to keep the proposed version of video recording A (e.g., in a specific protected location on the video recorder 116 and/or video storage server 118), a link or other selectable user interface element 910 to upload the proposed version of video recording A (e.g. to the social media server 114 and/or the video storage server 118), a link or other selectable user interface element 912 to view and interact with the full recorded version of video recording A (e.g., such as by presenting a user interface that includes a "cutting room floor" as shown in FIG. 9B), a link or other selectable user interface element 914 to share the proposed version of video recording A (e.g., via email, messaging service, chat, social media posting, etc.), and a link or other selectable user interface element 916 to adjust, accept or reject the in-point and/or output(s) that were selected by the user and/or automatically adjusted by the video recorder 116. In some embodiments, proposed versions of other recorded videos, such as a proposed version of video recording B 918, and corresponding options such as those described above may also be presented based on in-point and/or out-point(s) selected during recording of those other videos.

In some embodiments, what is actually stored on the video recorder 116 may just be the full recorded version of video A and the playing of the proposed version of video recording A in response to selection of the user interface element 904 may be performed by the video recorder 116 jumping during playback to specific locations in the full recorded version of video A indicated by the in-point and/or out-point selected during recording of the video.

In some embodiments, selecting the link or other selectable user interface element 908 to keep the proposed version of video recording A, the link or other selectable user interface element 910 to upload the proposed version of video recording A, and/or the link or other selectable user interface element 914 to share the proposed version of video recording A will trigger or otherwise cause the video recorder 116 to delete the full recorded version of video A (or delete the portions of the full recorded version of video A that are not included in the proposed version of video recording A). In various embodiments, some or all of these options may be provided in response to the user selecting other user interface elements. Other gestures, selectable user interface element arrangements and combinations thereof may be used in various other embodiments to implement the control of the video playback and selection of proposed versions of recorded videos via the GUI 602.

FIG. 9B is an example GUI 602 on video recorder 116 showing an example state of the GUI 602 after a user selects an option to view full recorded versions of recorded videos, according to various example embodiments. The state of example GUI 602 shown in FIG. 9B shows a "cutting room floor" providing access to full recorded versions of videos recorded by the video recorder (or the portions of the full recorded versions of videos that were excluded in the proposed versions of those videos shown in FIG. 9A). For example, the video recorder 116 may present the state of example GUI 602 that is shown in FIG. 9B in response to the user selecting a link or other selectable user interface element 912 shown in FIG. 9A to see and interact with the full recorded version of video recording A. Shown is a is a link or other selectable user interface element 920 to delete all contents of the "cutting room floor", e.g., delete all the full recorded versions of videos recorded by the video recorder (or the portions of the full recorded versions of videos that were excluded in the proposed versions of those videos shown in FIG. 9A). Also shown is a link or other selectable user interface element 922 to delete selected contents of the "cutting room floor", e.g., delete selected full recorded versions of videos recorded by the video recorder (or the portions of the selected full recorded versions of videos that were excluded in the proposed versions of those videos shown in FIG. 9A).

For example video recording A, shown in FIG. 9 is a user interface element 924 that indicates the full recorded version of video A and a plurality of selectable user interface elements to access or interact with the full recorded version of video A. Displayed is a link or other selectable user interface element 926 to play the full recorded version of video A, a link or other selectable user interface element 928 to delete the full recorded version of video A, a link or other selectable user interface element 930 to keep the full recorded version of video A (e.g., in a specific protected location on the video recorder 116 and/or video storage server 118) a link or other selectable user interface element 932 to upload the full recorded version of video A (e.g. to the social media server 114 and/or the video storage server 118), a link or other selectable user interface element 934 to share the full recorded version of video A and a link or other selectable user interface element 936 to select the full recorded version of video A (e.g., for deletion in response to the section of the user interface element 922 to delete selected contents of the "cutting room floor"). In various embodiments, some or all of these options may be provided in response to the user selecting other user interface elements, such as a user interface element to go to a specific area (e.g., the "cutting room floor") to show full versions of recorded videos and/or portions of the full versions of recorded videos that were not included in the corresponding proposed versions of the video recordings. In some embodiments, full recorded versions of other recorded videos, such as a proposed version of video recording B 938, and corresponding options such as those described above may also be presented.

Other gestures, selectable user interface element arrangements and combinations thereof may be used in various other embodiments to implement the control of the viewing, video playback, selection and deletion of full recorded versions of recorded videos via the GUI 602.

Figure 10:
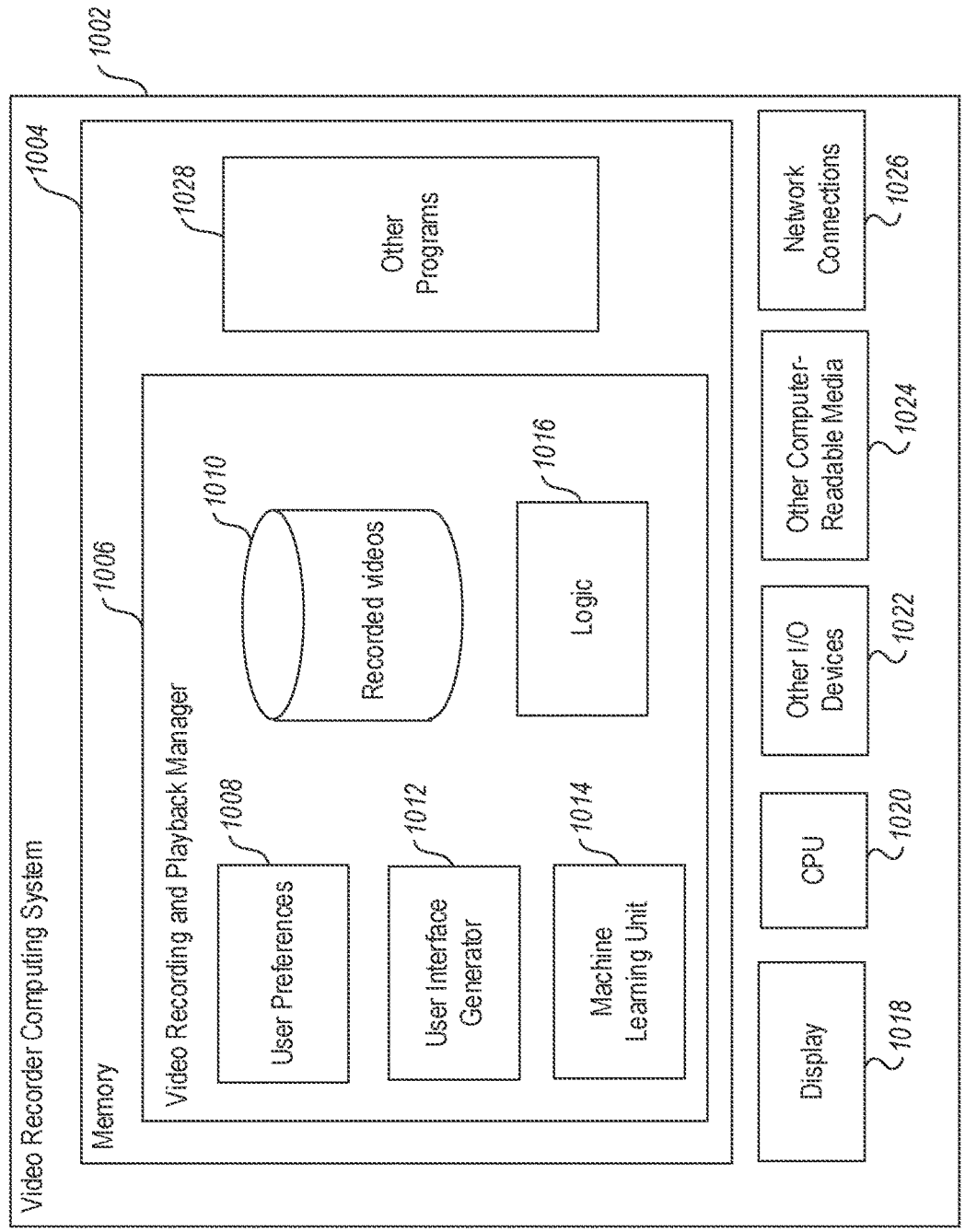
FIG. 10 is a block diagram of an example video recorder computing system, according to various example embodiments.

FIG. 10 is a block diagram of an example video recorder computing system 1002, according to various example embodiments. For example, the video recorder computing system 1002 may be that of the video recorder 116 and used to implement the systems and methods for versatile video recording disclosed herein. Some or all of the device, components and functionality of the video recorder computing system 1002 may also or instead be included in any of the systems shown in FIG. 1 as applicable to implement the functionality of those systems disclosed herein and the systems and methods for versatile video recording disclosed herein.

The video recorder computing system 1002 may be utilized to implement a video recording and playback manager 100 of the video recorder 116. The video recording and playback manager 1006 implements the processes and algorithms described herein for versatile video recording involving the various devices shown in FIG. 1. For example, the video recording and playback manager 1006 may include or implement components of a video recording application, video playing application, a video codec, video editing application, machine learning or other AI model, motion detection and computer vision systems, a video storage application programming interface (API) or other system module that performs the algorithms described herein for versatile video recording. Each system shown in FIG. 1 may have its own version of the video recording and playback manager 1006 that implements the processes and algorithms that the respective system performs as described herein. One or more general purpose or special purpose computing systems/devices may be used to implement the video recording and playback manager 1006. In addition, video recorder computing system 1002 may comprise one or more distinct computing systems/devices and may span distributed locations. Furthermore, each block shown may represent one or more such blocks as appropriate to a specific embodiment or may be combined with other blocks. Also, the video recording and playback manager 1006 may be implemented in software, hardware, firmware, or in some combination to achieve the capabilities described herein.

In the embodiment shown, video recorder computing system 1002 comprises a computer memory ("memory") 1004, a user interface display 1018 (which may be a touchscreen in some embodiments), one or more Central Processing Units ("CPUs") 1020 (which may also include one or more graphics processing units (GPUs)), other input/output devices 1022 (e.g., a video camera, a microphone, sensor, touchscreen, keyboard, mouse, RF or infrared receiving device, CRT or LCD display, and the like), other computer-readable media 1024, and network connections 1026. Network connections 1026 represent the communication modules, interfaces, modems, network adapters, tuners, radios, receivers, transceivers, demodulators, demultiplexers, packet filters, network equipment, etc., of video recorder computing system 1002 that are configured and operable to receive data from and interface with the systems of FIG. 1 described herein over communication system 108.

The video recording and playback manager 1006 is shown residing in memory 1004. In other embodiments, some portion of the contents and some of or all of the components of the video recording and playback manager 1006 may be stored on and/or transmitted over the other computer-readable media 1024. The components of the video recording and playback manager 1006 execute on one or more CPUs 1020 and cause the algorithms shown in FIGS. 11-16 and other algorithms described herein to be performed.

Other code or programs 1028 (e.g., video processing applications, social media applications, Internet applications, an operating system, a network layer stack, graphics programs, application programming interfaces (APIs) and the like) and potentially other data repositories, also reside in the memory 1004, and may execute on one or more CPUs 1020. Of note, one or more of the components in FIG. 10 may not be present in any specific implementation. For example, some embodiments may not provide other computer readable media 1024.

In some embodiments, the video recording and playback manager 1006 may include a user preferences module 1008, a user interface generator 1012, a machine learning unit 1014, a recorded videos repository 1010 that includes videos recorded by the video recording and playback manager 1006, and logic 1016 that includes the program code to implement the methods, including the processes and algorithms described herein, for implementing versatile video recording and which may be performed by the video recording and playback manager 1006. Other and/or different modules may be implemented. The video recording and playback manager 1006 may interact via network connections 1026 with the other systems shown in FIG. 1 and various other devices not shown in FIG. 1 via the communication system 108 shown in FIG. 1.

The user preferences module 311 stores data representing the user preferences and selections described herein as well as default values set for the user. This data may include, but is not limited to, user preferences regarding: user input indicating to delete all portions of the video that are not included in the proposed recorded version of the video; deleting all portions of the video that are not included in the proposed recorded version of the video upon uploading of the proposed recorded version of the video (e.g., to the video storage server 118); deleting all portions of the video that are not included in the proposed recorded version of the video upon posting to an online social media server or web site (e.g., to social media server 114) the proposed recorded version of the video; saving to a specific protected location the proposed recorded version of the video (e.g., to a specific protected location on video recorder 116 or video storage server 118); deleting all portions of the video that are not included in the proposed recorded version of the video upon memory capacity (e.g., of the video recorder 116 or video storage server 118) reaching a minimum threshold; deleting all portions of the video that are not included in the proposed recorded version of the video upon viewing or otherwise accepting the proposed recorded version of the video; and adjustments to in-point and/or out-point selections made during recording of the video. In some embodiments, such preferences may be stored at the video processing server 112 and/or social media server 114 shown in FIG. 1 and associated with a particular user or user profile. In this manner, such preferences are able to be accessed and followed across multiple devices associated with the user.

The user interface generator 1012 provides a view and a controller that facilitate user interaction with the video recording and playback manager 1006, an operating system, social media applications, or their various components. For example, the user interface generator 1012 provides interactive graphical user interface screens and/or elements that provide the user interfaces shown in FIGS. 6-9 and otherwise described herein. The user interface generator 1012 also may provide the user the ability to configure the video recording and playback manager 1006 and select user preferences 1008 as described herein. In some embodiments, the video recording and playback manager 1006 includes an API that provides programmatic access to one or more functions of the video recording and playback manager 1006. For example, such an API may provide the video processing server 112, video storage server 118, and/or social media server 114 a programmatic interface to one or more functions of the video recording and playback manager 1006 residing on the video recorder 116.

In an example embodiment, components or modules of the video recording and playback manager 1006 are implemented using a particular programming technique. For example, the video recording and playback manager 1006 may be implemented as a "native" executable running on the CPU 1020, along with one or more static or dynamic libraries. In other embodiments, the video recording and playback manager 1006 may be implemented as instructions processed by a virtual machine that executes as one of the other programs 1028. In general, a range of programming languages may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

In a software or firmware implementation, instructions stored in a memory cause, when executed, one or more processors of video recorder computing system 1002 to perform the functions of the video recording and playback manager 1006. For example, instructions stored in memory when executed by a computer processor modify the data in the same or another memory address space, thus performing the functions of the video recording and playback manager 1006. Alternatively, instructions stored in memory when executed by a processor, could modify the control registers of an application specific integrated circuit (ASIC) to configure it to perform the functions of the video recording and playback manager 1006. Such an ASIC may directly access and modify the memory of the computer processor without the intervention of the computer processor (DMA operation). In one embodiment, instructions, when executed, cause the CPU 1020 or some other processor, such as an I/O controller/processor, to buffer or otherwise record programming, such as by consuming program data and writing it to a disk or other storage device, by initiating a suitable DMA operation, or the like. Similarly, the CPU 1020 or other processor may be configured to perform other operations such as processing and integrating other types of media content received by the video recorder 116.

The embodiments described above may also use synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Also, functions could be implemented and/or performed by each component/module, and in different orders, and by different components/modules, yet still achieve the functions of the video recording and playback manager 1006. For example, one way (broadcast) and/or two-way (interactive) wide area networks (WAN) may be used for electronic communication. Both types of networks may use storage local to one or more of the systems shown in FIG. 1 and under local control on the local area network (LAN).

In addition, programming interfaces to the data stored as part of the video recording and playback manager 1006, such as in the recorded videos repository 1010, can be available by standard mechanisms such as through C, C++, C#, and Java APIs; libraries for accessing files, databases, or other data repositories; through scripting languages such as XML; or through Web servers, FTP servers, or other types of servers providing access to stored data. The recorded videos repository 1010 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of a shorthand item processing manager.

Furthermore, in some embodiments, some or all of the components of the video recording and playback manager 1006 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on, or transmitted/communicated by, various non-transitory or transitory computer-readable mediums (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

One or more of the same or similar computing system and implementation technologies described above with respect to video recorder computing system 1002 and implementation of the video recording and playback manager 1006 may be utilized by any of the systems shown in FIG. 1 as applicable to implement the functions of the system for versatile video recording described herein.

Figure 11:
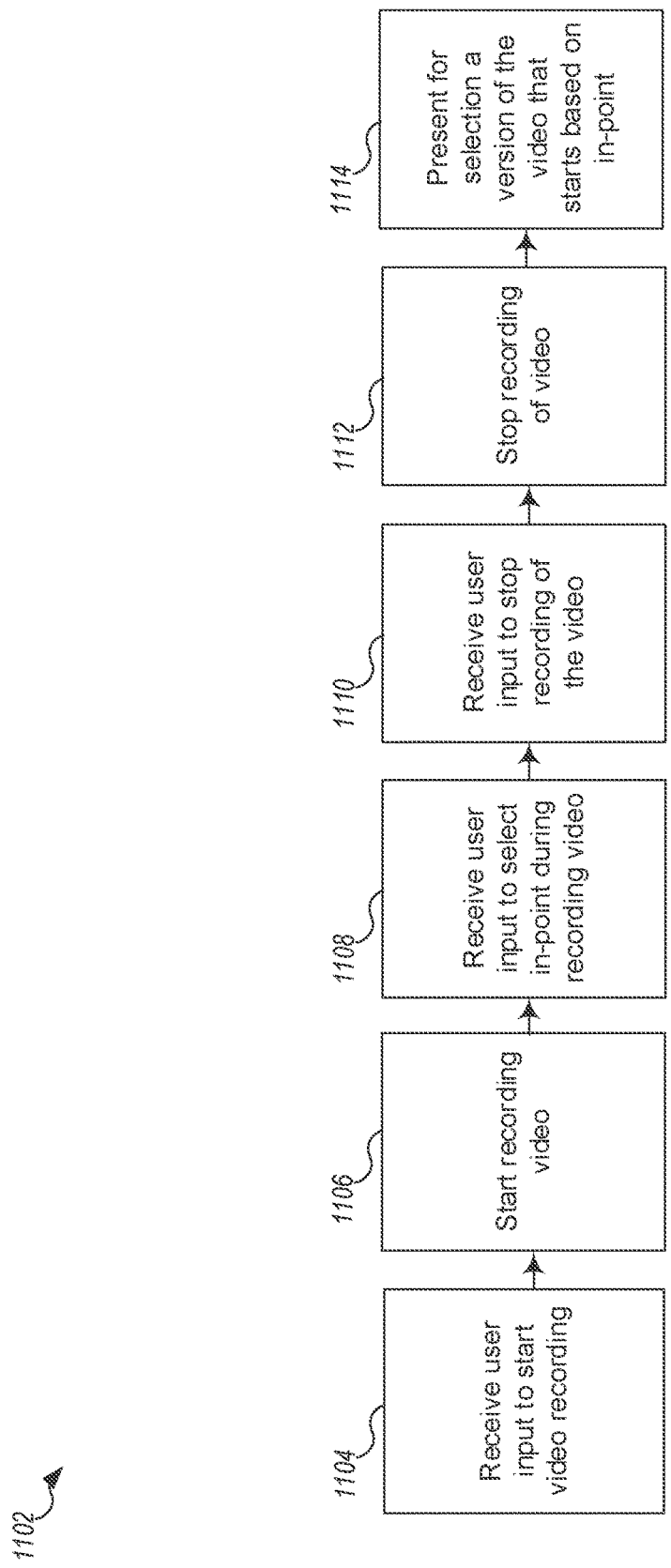
FIG. 11 is a flow diagram of an example method for versatile video recording involving receiving and processing user input to select an in-point during recording of a video, according to various example embodiments.

FIG. 11 is a flow diagram of an example method 1102 for versatile video recording involving receiving and processing user input to select an in-point during recording of a video, according to various example embodiments.

At 1104, the video recorder 116 receives user input indicative of an electronic selection to start video recording.

At 1106, the video recorder 116 starts recording video of live action in response to the selection to start video recording.

At 1108, during the recording of the video by the video recorder 116, the video recorder 116 receives user input indicative of electronic selection of one or more in-points for the video currently being recorded.

At 1110, the video recorder 116 receives user input indicative of an electronic selection to stop recording of the video currently being recorded.

At 1112, the video recorder 116 stops recording of the video currently being recorded in response to the selection to stop video recording.

At 1114, after the stopping recording of the video, the video recorder 116 presents for selection a recorded version of the video that starts based on a determined in-point of the one or more in-points selected during the recording of the video. In some embodiments, the determined in-point is a most recently selected in-point of a plurality of in-points for the video electronically selected via user input during the recording of the video before stopping recording of the video. In some embodiments, in response to the stopping recording of the video, the video recorder deletes all portions of the video that are not included in the recorded version of the video that starts based on the determined in-point of the one or more in-points selected during the recording of the video. To save memory and increase efficiency, in some embodiments, this deletion may occur automatically during recording of the video according to each in-point as each in-point is selected, such that when the recording stops, the resulting video saved on the video recorder 116 is the recorded version of the video that starts based on the determined in-point of the one or more in-points selected during the recording of the video.

In some embodiments, to save memory, during recording of the video, all or some of the recorded video that is before a most recently selected in-point will be stored in a buffer (e.g., a circular buffer) by the video recorder 116 in which the part of the oldest of such recorded video that surpasses a threshold size will be deleted by the video recorder 116 in order to keep the buffer from becoming full or nearly full.

In other embodiments, the video recorder 116 receives an indication to delete all portions of the video that are not included in the recorded version of the video that starts based on the determined in-point of the one or more in-points selected during the recording of the video. In response to receiving the indication, the video recorder 116 deletes all portions of the video that are not included in the recorded version of the video that starts based on the determined in-point of the one or more in-points selected during the recording of the video.

In some embodiments, the indication to delete all portions of the video that are not included in the recorded version of the video that starts based on the determined in-point of the one or more in-points selected during the recording of the video is selected from the group consisting of: user input indicating to delete all portions of the video that are not included in the recorded version of the video that starts based on the determined in-point of the one or more in-points selected during the recording of the video; uploading of the recorded version of the video that starts based on the determined in-point of the one or more in-points selected during the recording of the video; posting to an online social media server or web site the recorded version of the video that starts based on the determined in-point of the one or more in-points selected during the recording of the video; saving to a specific protected location the recorded version of the video that starts based on the determined in-point of the one or more in-points selected during the recording of the video; and memory capacity reaching a minimum threshold.

Figure 12:
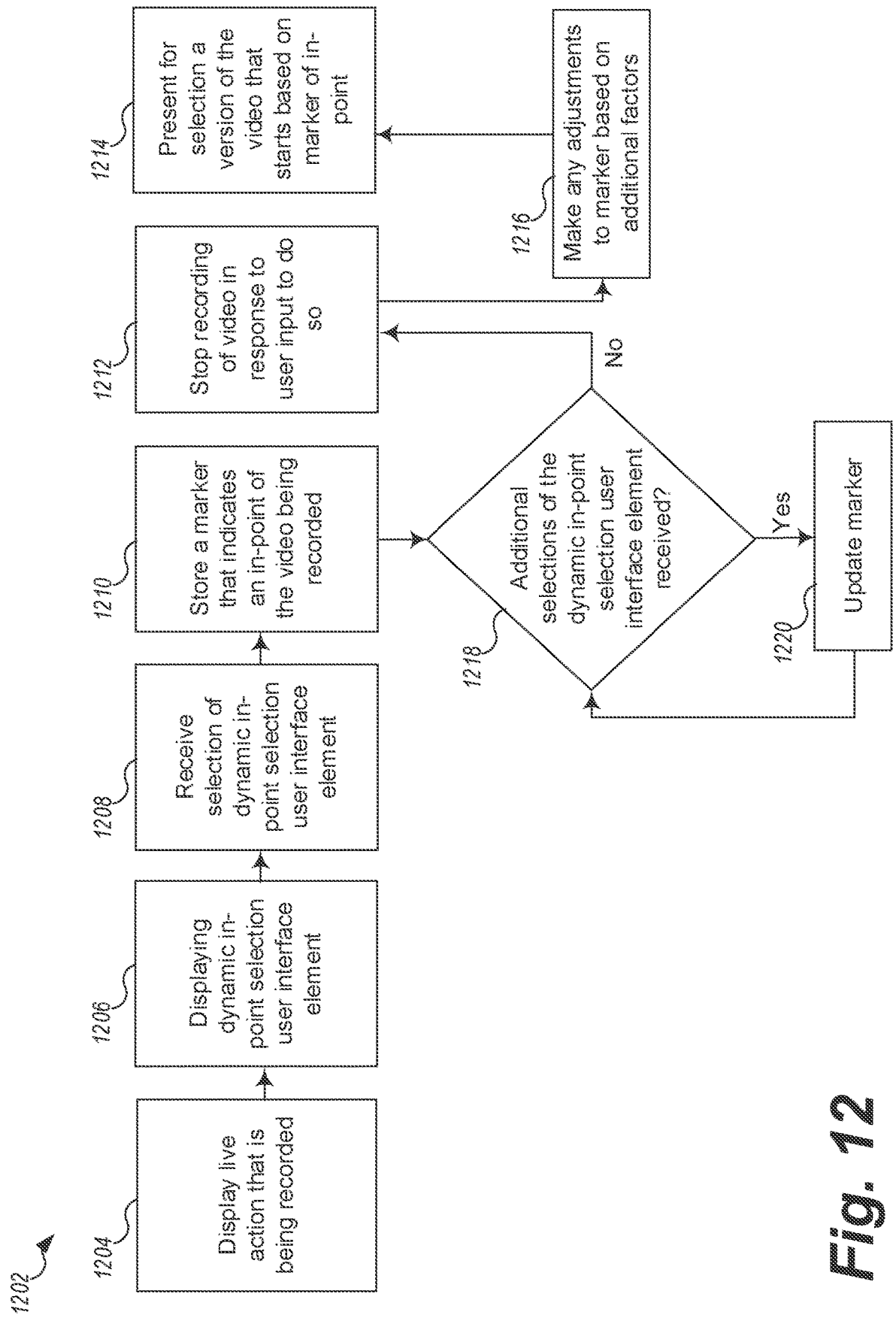
FIG. 12 is a flow diagram of an example method for versatile video recording involving updating and adjusting an in-point that was selected during recording of a video, according to various example embodiments.

FIG. 12 is a flow diagram of an example method 1202 for versatile video recording involving updating and adjusting an in-point that was selected during recording of a video, according to various example embodiments.

At 1204, the video recorder 116 displays on a user interface live action that is being recorded during video recording.

At 1206, the video recorder 116 displays on the user interface a dynamic in-point selection user interface element while displaying on the user interface the live action that is being recorded during the video recording.

At 1208, during the recording of the video, the video recorder 116 receives an indication of selection of the dynamic in-point selection user interface element. The selection of the dynamic in-point selection user interface element may be associated with live action that is being recorded at a time at which the indication of the selection of the dynamic in-point selection user interface element is received.

At 1210, in response to receiving the indication of the selection of the dynamic in-point selection user interface element, during the recording of the video, the video recorder 116 electronically stores a marker that indicates an in-point of the video being recorded. The video recorder 116 may associate the marker with the time at which the indication of the selection of the dynamic in-point selection user interface element was received. Also or instead, the video recorder 116 may associate the marker with a video frame of the video being recorded that was being displayed on the video recorder at the time at which the indication of the selection of the dynamic in-point selection user interface element was received. In some embodiments, the marker indicates a closest I-frame to a frame of the video being recorded which was being displayed on the user interface at the time at which the indication of the selection of the dynamic in-point selection user interface element was received during recording of the video.

At 1218, during the recording of the video, video recorder 116 determines whether a subsequent additional indication of selection of the dynamic in-point selection user interface element was received. If it was determined by the video recorder 116 that a subsequent additional indication of selection of the dynamic in-point selection user interface element was received, then the method proceeds to 1220. If it was determined by the video recorder 116 that a subsequent additional indication of selection of the dynamic in-point selection user interface element was not received, then the method proceeds to 1212.

At 1220, during the recording of the video, video recorder 116 updates the marker to indicate an in-point of the video being recorded associated with a time at which the additional indication of the selection of the dynamic in-point selection user interface element was received. Also or instead, the video recorder 116 may associate the marker with a video frame of the video being recorded that was being displayed on the video recorder at the time at which the additional indication of the selection of the dynamic in-point selection user interface element was received. The method then proceeds to 1218 to determine whether a subsequent additional indication of selection of the dynamic in-point selection user interface element was received. In some embodiments, as each an additional indication of selection of the dynamic in-point selection user interface element is received during recording, the video recorder 116 updates the marker as above at 1220 in response to receiving the indication.

At 1212, the video recorder 116 stops recording of the video currently being recorded in response to user input indicative of an electronic selection to stop recording of the video currently being recorded.

At 1216, the video recorder 116 makes any adjustments to the marker based on additional factors. For example, the marker that indicates the in-point of the video being recorded may be adjusted or otherwise set to indicate a frame of the video that was recorded at a predetermined amount of time that is before the time at which the indication of the selection of the dynamic in-point selection user interface element was received during recording of the video. In some embodiments, the video recorder 116 may present a selectable option to a user via a user interface to select a specific amount of time to be the predetermined amount of time. In response to presenting the selectable option, the video recorder 116 may receive an indication of a selected specific amount of time that is to be the predetermined amount of time. The video recorder 1116 may then adjust or otherwise set the predetermined amount of time to be the selected specific amount of time. The predetermined amount of time may also or instead be based on one or more of the following: a detected motion in the video being recorded before the time at which the indication of the selection of the dynamic in-point selection user interface element was received; previous adjustments made by the user to in-point selections of previously recorded videos; a detected location of the video recorder; and a selected recording mode associated with a type of content of video.

In some embodiments, the video recorder 116 may determine the predetermined amount of time based on a predicted amount of time from a machine learning model trained on a plurality of previous adjustments made in response to user input to previous markers that each indicated a respective in-point of a respective video being recorded. The respective in-point may be associated with a time at which an indication of a selection of the dynamic in-point selection user interface element was received for the respective video as the respective video was being recorded.

At 1214, the video recorder 116 presents for selection a recorded version of the video that starts at a time based on the updated marker that indicates the in-point of the video being recorded associated with the time at which the additional indication of the selection of the dynamic in-point selection user interface element was received during recording of the video.

Figure 13:
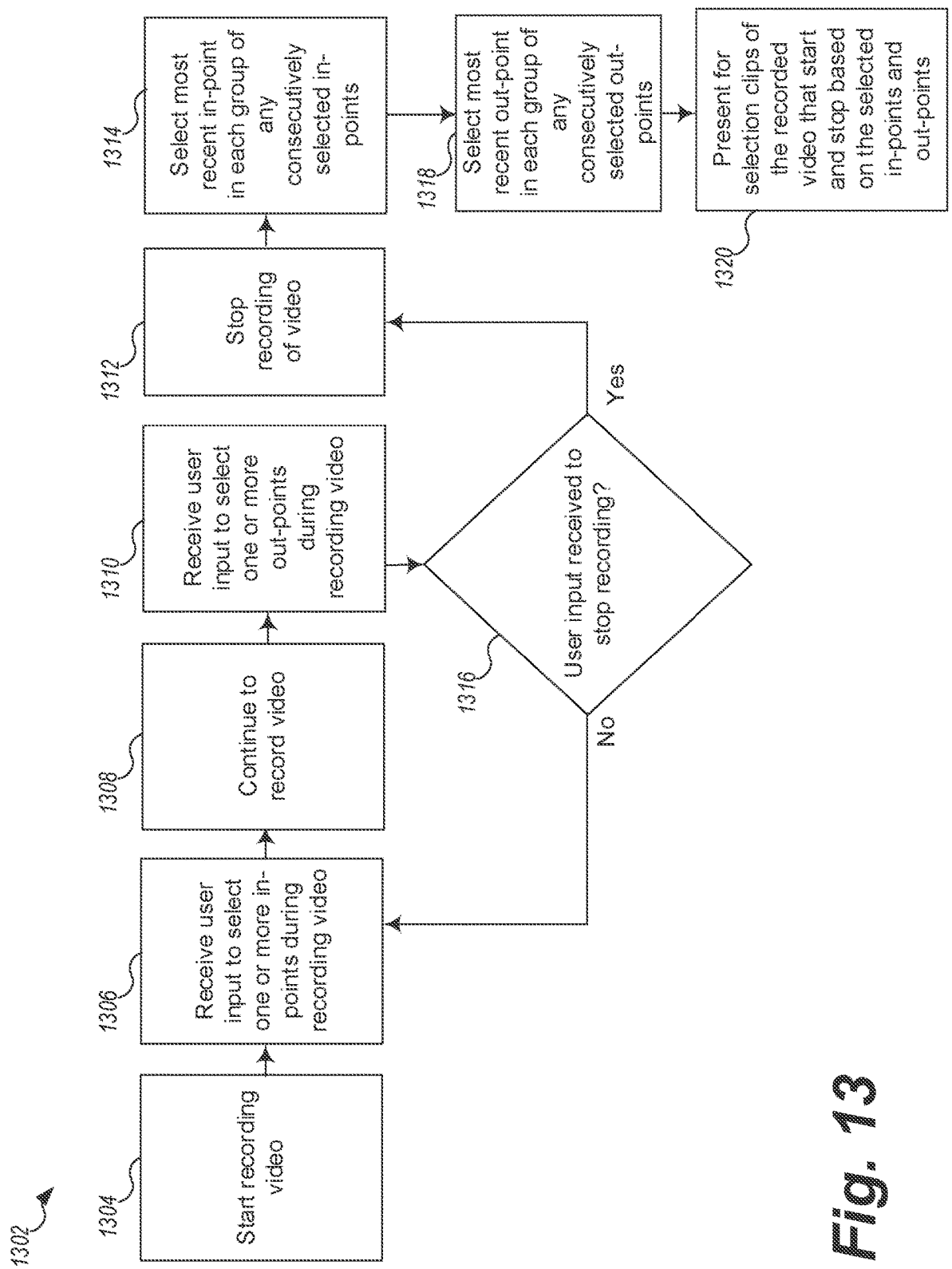
FIG. 13 is a flow diagram of an example method for versatile video recording involving multiple in-points and multiple out-points for the video that were selected during recording of the video, according to various example embodiments.

FIG. 13 is a flow diagram of an example method 1302 for versatile video recording involving multiple in-points and multiple outpoints for the video that were selected during recording of the video, according to various example embodiments.

At 1304, the video recorder 116 starts recording video of live action in response to a selection to start video recording.

At 1306, during the recording of the video by the video recorder 116, the video recorder 116 receives user input indicative of electronic selection of one or more in-points for the video currently being recorded.

At 1308, the video recorder 116 continues recording the video;

At 1310, the video recorder 116 receives user input indicative of electronic selection of one or more out-points for the video currently being recorded an continues recording the video;

At 1316, the video recorder 116 determines whether user input indicative of an electronic selection to stop recording of the video currently being recorded has been received. If it is determined that user input indicative of an electronic selection to stop recording of the video currently being recorded has been received, then the method proceeds to 1312. If it is determined that user input indicative of an electronic selection to stop recording of the video currently being recorded has not been received, then video recorder continues to record the video and proceeds to 1306.

At 1312, the video recorder 116 stops recording of the video currently being recorded in response to the selection to stop video recording.

At 1314, the video recorder 116, for each group of consecutively selected in-points of the one or more in-points, determines a corresponding determined in-point for a corresponding video clip of the video to be a most recently selected in-point of the group during recording of the video.

At 1318, the video recorder 116, for each group of consecutively selected out-points of the one or more out-points, determines a corresponding determined out-point for a corresponding video clip of the video to be a most recently selected out-point of the group during recording of the video.

At 1320, the video recorder 116 presents for selection recorded video clips of the video. Each recorded video clip starts based on a corresponding determined in-point of the one or more in-points selected during the recording of the video and each stops based on a corresponding determined out-point of the one or more out-points selected during the recording of the video.

Figure 14:
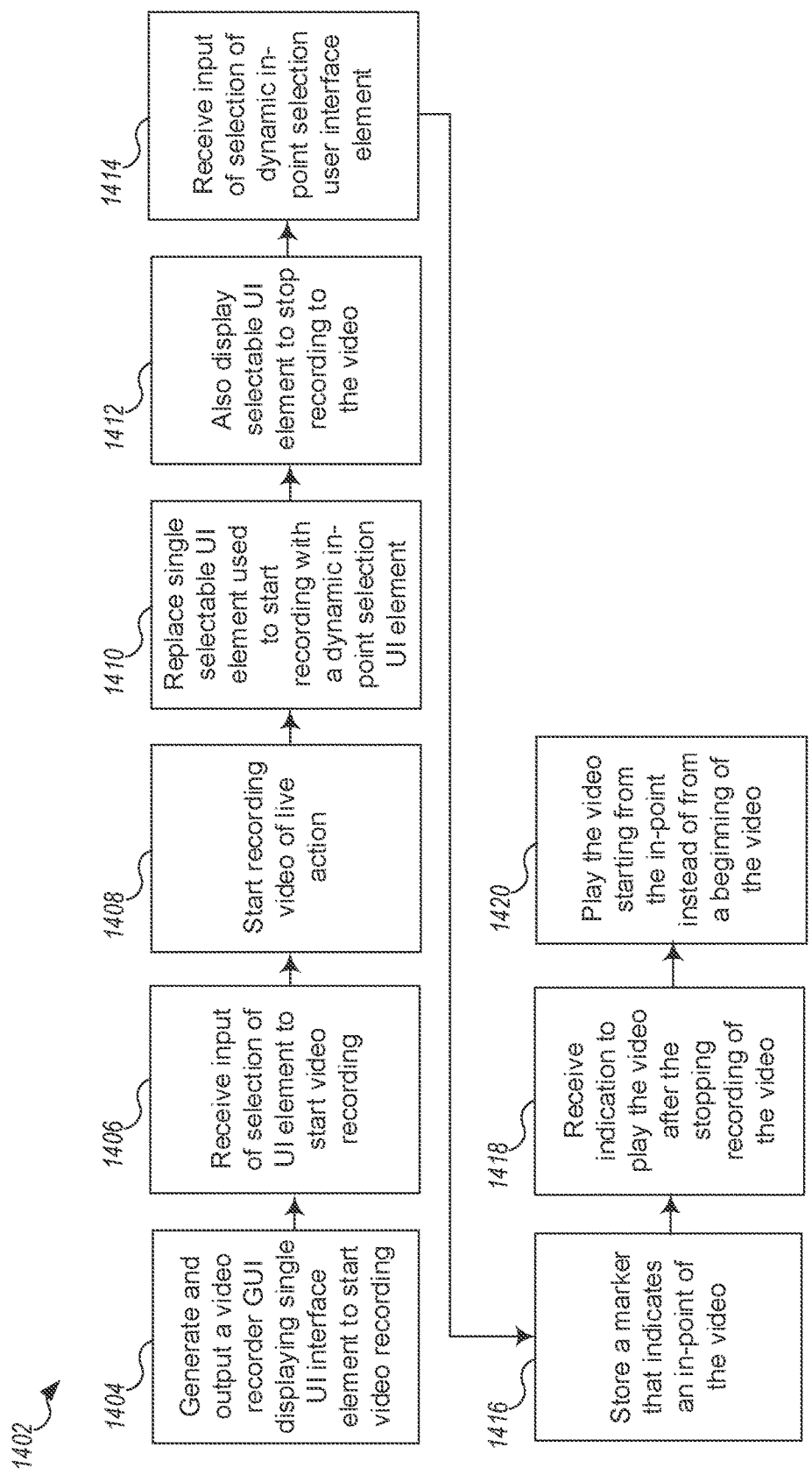
FIG. 14 is a flow diagram of an example method for versatile video recording involving a graphical user interface to enable selection of an in-point during recording of the video and playing of the video starting from the in-point, according to various example embodiments.

FIG. 14 is a flow diagram of an example method 1402 for versatile video recording involving a graphical user interface to enable selection an in-point during recording of the video and playing of the video starting from the in-point, according to various example embodiments.

At 1404, the video recorder 116 generates and outputs a video recorder GUI displaying a selectable user interface element to start video recording without displaying a selectable user interface element to stop or pause recording.

At 1406, the video recorder 116 receives user input indicative of a selection of the user interface (UI) element to start video recording.

At 1408, the video recorder 116 starts recording video of live action by the video recorder in response to the input indicative of the selection of the user interface element to start video recording.

At 1410, the video recorder 116, in response to starting video recording, removes from the video recorder graphical user interface the selectable user interface element to start video recording and replaces it with a dynamic in-point selection user interface element to indicate selection of one or more in-points for the video currently being recorded.

At 1412, the video recorder 116, in response to starting video recording, also displays in the video recorder graphical user interface a selectable user interface element to stop recording to the video.

At 1414, the video recorder 116, during the recording of the video, receives input indicative of selection of the dynamic in-point selection user interface element.

At 1416 the video recorder 116, in response to receiving input indicative of selection of the dynamic in-point selection user interface element, electronically stores a marker that indicates an in-point of the video based on a time at which the indication of the selection of the dynamic in-point selection user interface element was received.

At 1418 the video recorder 116 receives an indication to play the video after the stopping recording of the video.

At 1420 the video recorder 116 plays the video starting from the in-point instead of from a beginning of the video in response to receiving the indication to play the video.

Figure 15:
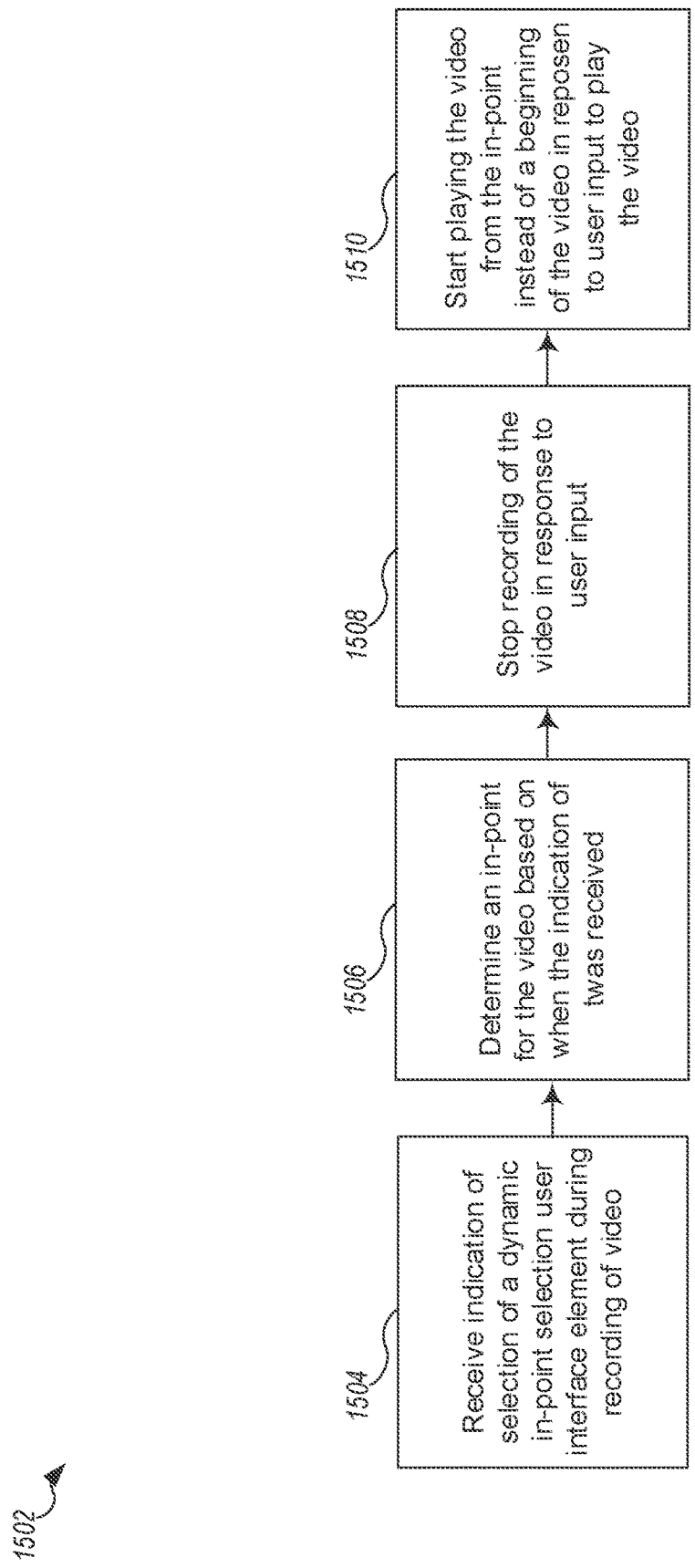
FIG. 15 is a flow diagram of an example method for versatile video recording involving determining an in-point during recording of a video and subsequent playing of the video, according to various example embodiments.

FIG. 15 is a flow diagram of an example method 1502 for versatile video recording involving determining an in-point during recording of a video and subsequent playing of the video, according to various example embodiments.

At 1504, the video recorder 116, during recording of a video capturing live action, receives an indication of selection of a dynamic in-point selection user interface element.

At 1506, the video recorder 116 determines an in-point for the video based on when the indication of the selection of the dynamic in-point selection user interface element was received.

At 1508, the video recorder 116, stops recording of the video in response to user input indicating to stop recording of the video.

At 1510, the video recorder 116, after stopping recording of the video, and in response to user input indicating to start playing the video that was recorded, starts playing the video from the in-point instead of a beginning of the video.

Figure 16:
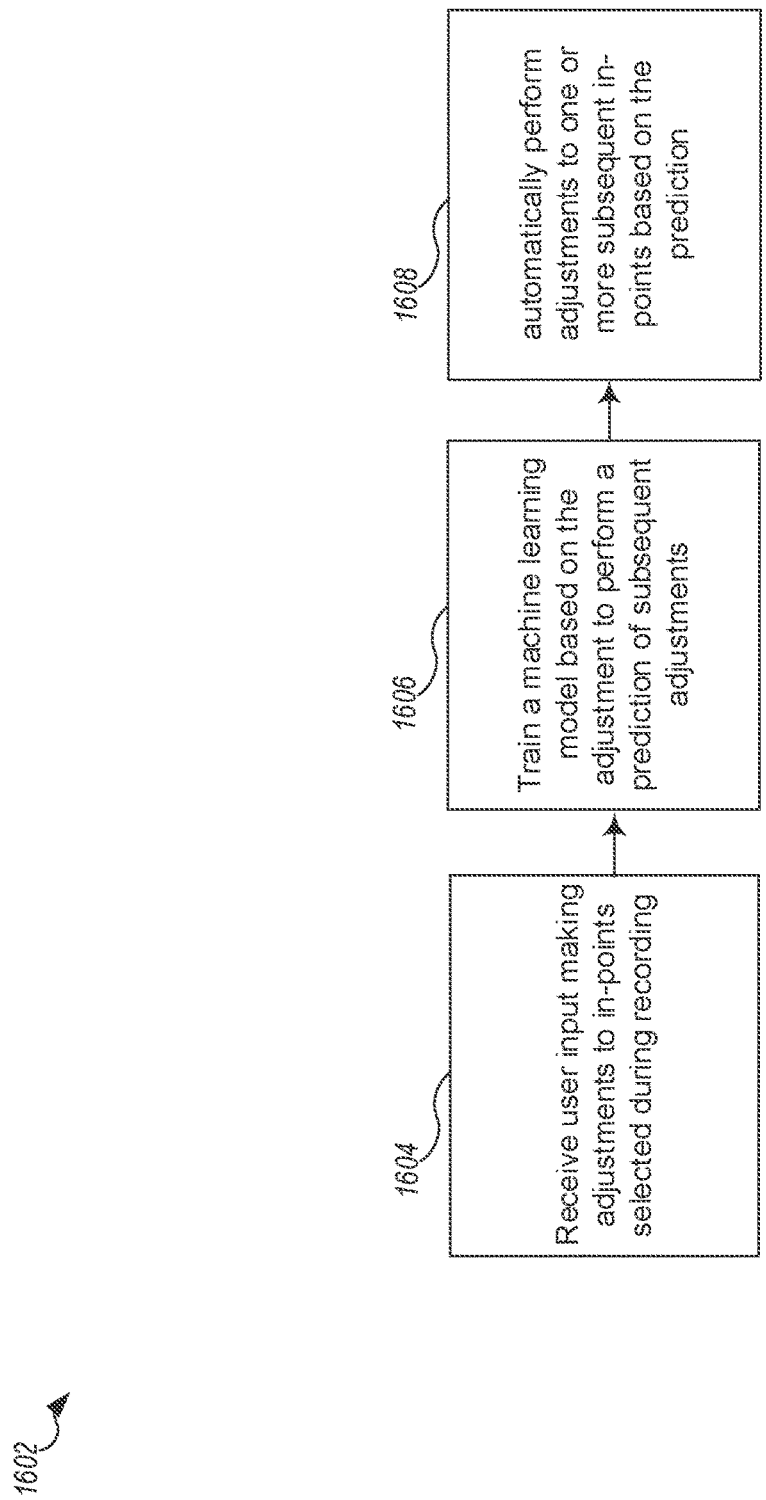
FIG. 16 is a flow diagram of an example method for versatile video recording involving machine learning to make adjustments to in-points selected during recording of videos, according to various example embodiments.

FIG. 16 is a flow diagram of an example method 1602 for versatile video recording involving machine learning to make adjustments to in-points selected during recording of videos, according to various example embodiments.

At 1604, the video recorder 116, after the stopping of recording of a video, receives user input making an adjustment to an in-point that was made via selection by a user during recording of the video.

At 1606, the video recorder 116 causes a machine learning model to be trained based on the adjustment to perform a prediction of adjustments of one or more subsequent in-points selected by the user for one or more corresponding subsequent video recordings.

At 1608, the video recorder 116 automatically performs adjustments to the one or more subsequent in-points based on the prediction during or in response to stopping recording of the one or more corresponding subsequent video recordings. In some embodiments, during or in response to stopping recording of the video, the video recorder 116 may also make an adjustment to the in-point based on detected motion in the video before the in-point, such that the detected motion is included in the playing of the video from the in-point.

A computer implemented method in a video recording system may be summarized as including receiving, by at least one computer processor, user input indicative of an electronic selection to start video recording; starting, by at least one computer processor, recording video of live action by a video recorder in response to the selection to start video recording; during the recording of the video by the video recorder, receiving, by at least one computer processor, user input indicative of electronic selection of one or more in-points for the video currently being recorded; receiving, by at least one computer processor, user input indicative of an electronic selection to stop recording of the video currently being recorded; stopping, by at least one computer processor, recording of the video currently being recorded in response to the selection to stop video recording; and after the stopping recording of the video, presenting for selection, by at least one computer processor, a recorded version of the video that starts based on a determined in-point of the one or more in-points selected during the recording of the video. The determined in-point may be a most recently selected in-point of a plurality of in-points for the video electronically selected via user input during the recording of the video before stopping recording of the video.

The receiving of the user input indicative of electronic selection of one or more in-points for the video currently being recorded may include displaying on a user interface the live action that is being recorded during the video recording; displaying on the user interface a dynamic in-point selection user interface element while displaying on the user interface the live action that is being recorded during the video recording; during the recording of the video, receiving an indication of selection of the dynamic in-point selection user interface element, the selection of the dynamic in-point selection user interface element associated with live action that is being recorded at a time at which the indication of the selection of the dynamic in-point selection user interface element is received; and in response to receiving the indication of the selection of the dynamic in-point selection user interface element, during the recording of the video, electronically storing a marker that indicates an in-point of the video being recorded, the marker associated with the time at which the indication of the selection of the dynamic in-point selection user interface element was received.

The method may further include during the recording of the video, determining, by at least one computer processor, whether a subsequent additional indication of selection of the dynamic in-point selection user interface element is received; and during the recording of the video, updating, by at least one computer processor, the marker to indicate an in-point of the video being recorded associated with a time at which the additional indication of the selection of the dynamic in-point selection user interface element was received.

The presenting for selection a recorded version of the video may include presenting for selection a recorded version of the video that starts at a time based on the updated marker that indicates the in-point of the video being recorded associated with the time at which the additional indication of the selection of the dynamic in-point selection user interface element was received during recording of the video. The presenting for selection a recorded version of the video may include presenting for selection a recorded version of the video that starts at a time based on the marker. The marker that indicates the in-point of the video being recorded may indicate a frame of the video being recorded which was being displayed on the user interface at the time at which the indication of the selection of the dynamic in-point selection user interface element was received during recording of the video. The marker that indicates the in-point of the video being recorded may indicate a closest I-frame to a frame of the video being recorded which was being displayed on the user interface at the time at which the indication of the selection of the dynamic in-point selection user interface element was received during recording of the video. The marker that indicates the in-point of the video being recorded may be set to indicate a frame of the video that was recorded at a predetermined amount of time that is before the time at which the indication of the selection of the dynamic in-point selection user interface element was received during recording of the video.

The method may further include presenting, by at least one computer processor, a selectable option to select a specific amount of time to be the predetermined amount of time; in response to presenting the selectable option, receiving, by at least one computer processor, an indication of a selected specific amount of time that is to be the predetermined amount of time; and setting the predetermined amount of time that is before the time at which the indication of the selection of the dynamic in-point selection user interface element was received to be the selected specific amount of time. The predetermined amount of time may be based on detected motion in the video being recorded before the time at which the indication of the selection of the dynamic in-point selection user interface element was received. The predetermined amount of time may be based on a detected location of the video recorder. The predetermined amount of time may be based on a selected recording mode associated with a type of content of video.

The method may further include after the stopping recording of the video, presenting, by at least one computer processor, a user interface enabling adjustment the predetermined amount of time that is before the time at which the indication of the selection of the dynamic in-point selection user interface element was received; and adjusting, by at least one computer processor, the predetermined amount of time that is before the time at which the indication of the selection of the dynamic in-point selection user interface element was received based on input received via the user interface.

The method may further include determining, by at least one computer processor, the predetermined amount of time that is before the time at which the indication of the selection of the dynamic in-point selection user interface element was received based on a predicted amount of time from a machine learning model trained on a plurality of previous adjustments made in response to user input to previous markers that each indicated a respective in-point of a respective video being recorded, the respective in-point associated with a time at which an indication of a selection of the dynamic in-point selection user interface element was received for the respective video as the respective video was being recorded.

The method may further include receiving, by at least one computer processor, an indication to delete all portions of the video that are not included in the recorded version of the video that starts based on the determined in-point of the one or more in-points selected during the recording of the video; and in response to receiving the indication, deleting, by at least one computer processor, all portions of the video that are not included in the recorded version of the video that starts based on the determined in-point of the one or more in-points selected during the recording of the video.

The indication may be selected from the group consisting of: user input indicating to delete all portions of the video that are not included in the recorded version of the video that starts based on the determined in-point of the one or more in-points selected during the recording of the video; viewing of the recorded version of the video that starts based on the determined in-point of the one or more in-points selected during the recording of the video; viewing a particular number of times of the recorded version of the video that starts based on the determined in-point of the one or more in-points selected during the recording of the video; uploading of the recorded version of the video that starts based on the determined in-point of the one or more in-points selected during the recording of the video; posting to an online social media server or web site the recorded version of the video that starts based on the determined in-point of the one or more in-points selected during the recording of the video; saving to a specific protected location the recorded version of the video that starts based on the determined in-point of the one or more in-points selected during the recording of the video; and memory capacity reaching a minimum threshold; a particular amount of time passing since the video was recorded.

The method may further include in response to the stopping recording of the video, deleting, by at least one computer processor, all portions of the video that are not included in the recorded version of the video that starts based on the determined in-point of the one or more in-points selected during the recording of the video. The presenting for selection the recorded version of the video that starts based on a determined in-point of the one or more in-points selected during the recording of the video may be in response to the stopping recording of the video.

The method may further include before receiving the user input indicative of an electronic selection to stop recording of the video currently being recorded, and during the recording of the video by the video recorder, receiving, by at least one computer processor, user input indicative of electronic selection of one or more out-points for the video currently being recorded; continuing to record the video after receiving the user input indicative of electronic selection of one or more out-points for the video currently being recorded; after the stopping recording of the video, presenting for selection, by at least one computer processor, recorded video clips of the video that each starts based on a corresponding determined in-point of the one or more in-points selected during the recording of the video and each stops based on a corresponding determined out-point of the one or more out-points selected during the recording of the video. For each group of consecutively selected in-points of the one or more in-points, a corresponding determined in-point for a corresponding video clip of the recorded video clips may be determined to be a most recently selected in-point of the group during recording of the video. For each group of consecutively selected out-points of the one or more out-points, a corresponding determined out-point for a corresponding clip of the recorded clips may be determined to be a most recently selected out-point of the group during recording of the video.

A system of a video recorder may be summarized as including at least one computer processor; and a memory coupled to the at least one computer processor, wherein the memory has computer-executable instructions stored thereon, that when executed, cause the at least one computer processor to: generate and output a video recorder graphical user interface displaying a selectable user interface element to start video recording without displaying a selectable user interface element to stop or pause recording; receive user input indicative of a selection of the user interface element to start video recording; start recording video of live action by the video recorder in response to the input indicative of the selection of the user interface element to start video recording; in response to starting video recording: remove from the video recorder graphical user interface the selectable user interface element to start video recording; replace the selectable user interface element used to start video recording with a dynamic in-point selection user interface element to indicate selection of one or more in-points for the video currently being recorded; and display in the video recorder graphical user interface a selectable user interface element to stop recording to the video; during the recording of the video by the video recorder: receive input indicative of selection of the dynamic in-point selection user interface element; and in response to receiving input indicative of selection of the dynamic in-point selection user interface element, electronically store a marker that indicates an in-point of the video based on a time at which the indication of the selection of the dynamic in-point selection user interface element was received; receive an indication to play the video after the stopping recording of the video; and play the video starting from the in-point instead of from a beginning of the video in response to receiving the indication to play the video.

The system may further include in response to starting video recording, display in the video recorder graphical user interface a dynamic out-point selection user interface element to indicate selection of one or more out-points for the video currently being recorded; and during the recording of the video by the video recorder: receive input indicative of selection of the dynamic out-point selection user interface element; and in response to receiving input indicative of selection of the dynamic out-point selection user interface element, electronically store a marker that indicates an out-point of the video based on a time at which the indication of the selection of the dynamic out-point selection user interface element was received.

The system may further include in response to receiving input indicative of selection of the selectable user interface element to stop recording to the video: stop recording of the video; and display in the video recorder graphical user interface an option to view a recorded version of the video starting and stopping according to the in-point and out-point; and display in the video recorder graphical user interface an option to view a full recorded version of the video starting and stopping according to when the recording of the video started and when the recording of the video stopped.

A non-transitory computer-readable storage medium having computer-executable instructions thereon that, when executed by at least one computer processor, may cause at least one computer processor to during recording of a video capturing live action, receive an indication of selection of a dynamic in-point selection user interface element; determine an in-point for the video based on when the indication of the selection of the dynamic in-point selection user interface element was received; stop recording of the video in response to user input indicating to stop recording of the video; and after stopping recording of the video, in response to user input indicating to start playing the video that was recorded, start playing the video from the in-point instead of a beginning of the video.

The computer-executable instructions thereon, when executed by at least one computer processor, may further cause at least one computer processor to: receive user input making an adjustment to the in-point after the stopping of recording of the video; train a machine learning model based on the adjustment to perform a prediction of adjustments of one or more subsequent in-points selected by the user for one or more corresponding subsequent video recordings; and automatically perform adjustments to the one or more subsequent in-points based on the prediction during or in response to stopping recording of the one or more corresponding subsequent video recordings.

The computer-executable instructions thereon, when executed by at least one computer processor, may further cause at least one computer processor to: during or in response to stopping recording of the video, make and adjustment to the in-point based on a current location of the video recorder.

The computer-executable instructions thereon, when executed by at least one computer processor, may further cause at least one computer processor to: during or in response to stopping recording of the video, make an adjustment to the in-point based on detected motion in the video before the in-point, such that the detected motion is included in the playing of the video from the in-point.

The computer-executable instructions thereon, when executed by at least one computer processor, may further cause at least one computer processor to: after stopping recording of the video, displaying a graphical user interface element selectable to indicate whether the adjustment to the in-point is accepted.

While various embodiments have been described hereinabove, it is to be appreciated that various changes in form and detail may be made without departing from the spirit and scope of the invention(s) presently or hereafter claimed.

The invention claimed is:

1. A computer implemented method in a video recording system, the method comprising:
   receiving, by at least one computer processor, user input indicative of an electronic selection to start video recording;
   starting, by at least one computer processor, recording video of live action by a video recorder in response to the selection to start video recording;
   during the recording of the video by the video recorder, receiving, by at least one computer processor, user input indicative of electronic selection of one or more in-points for the video currently being recorded;
   receiving, by at least one computer processor, user input indicative of an electronic selection to stop recording of the video currently being recorded;
   stopping, by at least one computer processor, recording of the video currently being recorded in response to the selection to stop video recording; and
   after the stopping recording of the video, presenting for selection, by at least one computer processor, a separate recorded version of the video that does not start at a point corresponding to when the selection to start video recording was received, but instead starts based on a determined in-point of the one or more in-points selected during the recording of the video.

2. The method of claim 1, wherein the determined in-point is a most recently selected in-point of a plurality of in-points for the video electronically selected via user input during the recording of the video before stopping recording of the video.

3. The method of claim 1 further comprising:
   receiving, by at least one computer processor, an indication to delete all portions of the video that are not included in the recorded version of the video that starts based on the determined in-point of the one or more in-points selected during the recording of the video; and
   in response to receiving the indication, deleting, by at least one computer processor, all portions of the video that are not included in the recorded version of the video that starts based on the determined in-point of the one or more in-points selected during the recording of the video.

4. The method of claim 1 further comprising:
   in response to the stopping recording of the video, deleting, by at least one computer processor, all portions of the video that are not included in the recorded version of the video that starts based on the determined in-point of the one or more in-points selected during the recording of the video.

5. The method of claim 1 wherein the presenting for selection the recorded version of the video that starts based on a determined in-point of the one or more in-points selected during the recording of the video is in response to the stopping recording of the video.

6. The method of claim 1 further comprising:
   before receiving the user input indicative of an electronic selection to stop recording of the video currently being recorded, and during the recording of the video by the video recorder, receiving, by at least one computer processor, user input indicative of electronic selection of one or more out-points for the video currently being recorded;
   continuing to record the video after receiving the user input indicative of electronic selection of one or more out-points for the video currently being recorded;
   after the stopping recording of the video, presenting for selection, by at least one computer processor, recorded video clips of the video that each starts based on a corresponding determined in-point of the one or more in-points selected during the recording of the video and each stops based on a corresponding determined out-point of the one or more out-points selected during the recording of the video.

7. The method of claim 6 wherein for each group of consecutively selected in-points of the one or more in-points, a corresponding determined in-point for a corresponding video clip of the recorded video clips is determined to be a most recently selected in-point of the group during recording of the video.

8. The method of claim 6 wherein for each group of consecutively selected out-points of the one or more out-points, a corresponding determined out-point for a corresponding clip of the recorded clips is determined to be a most recently selected out-point of the group during recording of the video.

9. The method of claim 1 wherein the receiving of the user input indicative of electronic selection of one or more in-points for the video currently being recorded includes:
   displaying on a user interface the live action that is being recorded during the video recording;
   displaying on the user interface a dynamic in-point selection user interface element while displaying on the user interface the live action that is being recorded during the video recording;
   during the recording of the video, receiving an indication of selection of the dynamic in-point selection user interface element, the selection of the dynamic in-point selection user interface element associated with live action that is being recorded at a time at which the indication of the selection of the dynamic in-point selection user interface element is received; and
   in response to receiving the indication of the selection of the dynamic in-point selection user interface element, during the recording of the video, electronically storing a marker that indicates an in-point of the video being recorded, the marker associated with the time at which the indication of the selection of the dynamic in-point selection user interface element was received.

10. The method of claim 9 wherein the marker that indicates the in-point of the video being recorded is set to indicate a frame of the video that was recorded at a predetermined amount of time that is before the time at which the indication of the selection of the dynamic in-point selection user interface element was received during recording of the video.

11. A system comprising:
   at least one computer processor; and
   a memory coupled to the at least one computer processor, wherein the memory has computer-executable instructions stored thereon, that when executed, cause operations to be performed, the operations including:
      receiving, by at least one computer processor, user input indicative of an electronic selection to start video recording;
      starting, by at least one computer processor, recording video of live action by a video recorder in response to the selection to start video recording;
      during the recording of the video by the video recorder, receiving, by at least one computer processor, user input indicative of electronic selection of one or more in-points for the video currently being recorded;
      receiving, by at least one computer processor, user input indicative of an electronic selection to stop recording of the video currently being recorded;
      stopping, by at least one computer processor, recording of the video currently being recorded in response to the selection to stop video recording; and
      after the stopping recording of the video, presenting for selection, by at least one computer processor, a separate recorded version of the video that does not start at a point corresponding to when the selection to start video recording was received, but instead starts based on a determined in-point of the one or more in-points selected during the recording of the video.

12. The system of claim 11, wherein the determined in-point is a most recently selected in-point of a plurality of in-points for the video electronically selected via user input during the recording of the video before stopping recording of the video.

13. The system of claim 11 wherein the receiving of the user input indicative of electronic selection of one or more in-points for the video currently being recorded includes:
   displaying on a user interface the live action that is being recorded during the video recording;
   displaying on the user interface a dynamic in-point selection user interface element while displaying on the user interface the live action that is being recorded during the video recording;
   during the recording of the video, receiving an indication of selection of the dynamic in-point selection user interface element, the selection of the dynamic in-point selection user interface element associated with live action that is being recorded at a time at which the indication of the selection of the dynamic in-point selection user interface element is received; and
   in response to receiving the indication of the selection of the dynamic in-point selection user interface element, during the recording of the video, electronically storing a marker that indicates an in-point of the video being recorded, the marker associated with the time at which the indication of the selection of the dynamic in-point selection user interface element was received.

14. The system of claim 13 wherein the marker that indicates the in-point of the video being recorded is set to indicate a frame of the video that was recorded at a predetermined amount of time that is before the time at which the indication of the selection of the dynamic in-point selection user interface element was received during recording of the video.

15. The system of claim 13, wherein the operations further include:
   during the recording of the video, determining, by at least one computer processor, whether a subsequent additional indication of selection of the dynamic in-point selection user interface element is received; and
   during the recording of the video, updating, by at least one computer processor, the marker to indicate an in-point of the video being recorded associated with a time at which the additional indication of the selection of the dynamic in-point selection user interface element was received.

16. The method of claim 9, further comprising: during the recording of the video, determining, by at least one computer processor, whether a subsequent additional indication of selection of the dynamic in-point selection user interface element is received; and during the recording of the video, updating, by at least one computer processor, the marker to indicate an in-point of the video being recorded associated with a time at which the additional indication of the selection of the dynamic in-point selection user interface element was received.

17. The method of claim 16 wherein the presenting for selection a recorded version of the video includes presenting for selection a recorded version of the video that starts at a time based on the updated marker that indicates the in-point of the video being recorded associated with the time at which the additional indication of the selection of the dynamic in-point selection user interface element was received during recording of the video.

18. The method of claim 9 wherein the marker that indicates the in-point of the video being recorded indicates a closest I-frame to a frame of the video being recorded which was being displayed on the user interface at the time at which the indication of the selection of the dynamic in-point selection user interface element was received during recording of the video.

19. The method of claim 10 wherein the predetermined amount of time is based on a detected location of the video recorder.

20. The method of claim 10 wherein the predetermined amount of time is based on a selected recording mode associated with a type of content of video.

* * * * *